US009517363B1

(12) United States Patent
Thaw et al.

(10) Patent No.: US 9,517,363 B1
(45) Date of Patent: Dec. 13, 2016

(54) POWERED HAND-HELD FORCIBLE ENTRY DEVICE

(71) Applicants: Richard E. Thaw, Palm Beach Garden, FL (US); Madeleine Ambron Newman, Forest Hills, NY (US)

(72) Inventors: Richard E. Thaw, Palm Beach Garden, FL (US); Philip Newman, Forest Hills, FL (US)

( * ) Notice: Subject to any disclaimer, the term of this patent is extended or adjusted under 35 U.S.C. 154(b) by 820 days.

(21) Appl. No.: 13/943,563

(22) Filed: Jul. 16, 2013

Related U.S. Application Data

(63) Continuation-in-part of application No. 12/786,630, filed on May 25, 2010, now Pat. No. 8,485,508.

(60) Provisional application No. 61/181,537, filed on May 27, 2009.

(51) Int. Cl.
*B23Q 3/06* (2006.01)
*A62B 3/00* (2006.01)

(52) U.S. Cl.
CPC .................................... *A62B 3/005* (2013.01)

(58) Field of Classification Search
CPC .............. B66F 3/18; B66F 5/025; B66F 11/00
See application file for complete search history.

(56) References Cited

U.S. PATENT DOCUMENTS

| | | | | |
|---|---|---|---|---|
| 3,904,177 | A | 9/1975 | Dalton | |
| 4,896,862 | A | 1/1990 | Ganley | |
| 4,996,862 | A | 3/1991 | Schrors | |
| 5,048,795 | A * | 9/1991 | Vitale | A62B 3/005 254/93 R |
| 5,855,360 | A | 1/1999 | Wurdack | |
| 6,880,809 | B2 * | 4/2005 | Stephen | A62B 3/005 254/105 |
| 7,152,848 | B2 | 12/2006 | Pfleging, Jr. et al. | |
| 7,434,785 | B1 * | 10/2008 | McMorrow | A62B 3/005 254/134 |
| 8,485,508 | B1 * | 7/2013 | Newman | A62B 3/005 254/100 |
| 2009/0321696 | A1 * | 12/2009 | Birkholz | B60S 9/08 254/419 |

* cited by examiner

*Primary Examiner* — Lee D Wilson
(74) *Attorney, Agent, or Firm* — H. John Rizvi; Gold & Rizvi, P.A.

(57) ABSTRACT

A handheld forcible entry device includes a tubular housing. An input drive shaft is rotationally assembled to the housing, wherein the input shaft rotates about an axis perpendicular to a longitudinal axis of the housing. A helical pressure applicating lead screw is rotationally assembled to the housing, wherein the lead screw rotates about an axis parallel to the housing longitudinal axis. The input shaft and lead screw are rotationally synchronized by a bevel gear set. A pressure applicator is threadably engaged with a helical threaded segment integrated in the lead screw. Rotation of the threading advances or retracts the pressure applicator from a stationary wedge plate. The separation of the pressure applicator and the stationary wedge plate separates a locked member from the associated frame, thus forcibly opening the locked member. The input shaft can be operated using a manually applied rotation or power applied rotation.

21 Claims, 25 Drawing Sheets

POWERED HAND-HELD FORCIBLE ENTRY DEVICE

CROSS REFERENCE TO RELATED APPLICATIONS

This application is a Continuation-In-Part claiming the benefit of U.S. Non-Provisional Utility patent application Ser. No. 12/786,630, filed on May 25, 2010 (scheduled to issue as U.S. Pat. No. 8,485,508 on Jul. 16, 2013), which claims the benefit of U.S. Provisional Patent Application Ser. No. 61/181,537, filed on May 27, 2009, which are incorporated herein in their entireties.

FIELD OF THE INVENTION

This invention relates generally to a hand held, mechanical or powered locked door opening device, light in weight and operable in any orientation, for generating a substantial door-opening force. More particularly, the locked door-opening device is capable of providing a set of useful features for emergency personnel using a simple portable device.

DESCRIPTION OF THE PRIOR ART

Forcible entry is a technique used to gain access to a structure whose normal means of access is locked, blocked, or nonexistent.

There are several situations in which a forcible entry is required. Some of the most common are: rescue, escape, fire, preventing further property loss, accessing areas critical to pass through, and the like. Each different forcible entry always involves forcing an opening of a door or a window, wherein the process utilizes a specific tool or series of tools for the respective application.

Depending on the physical structure and function, the tools used during a forcible entry may be classified as: striking tools, prying tools, hydraulic tools, lock pulling tools, cutting tools, and the like.

Examples of striking tools include a flat-head axe, a sledgehammer, a battering ram, a hammer, a duck-billed lock breaker, and the like.

The flat-head axe, whose primary use is for breaking down doors, comprises a chrome-plated or steel flat head attached to a distal end of a wooden, plastic, or composite handle. The flat head axe is heavy enough for a short strike stroke on an iron or padlock breaker, wherein the axes' large oversized head increases accuracy when targeting a strike stroke zone. The flat head axe includes a cutting edge, which is usually annealed to increase the longevity of the edge.

A sledgehammer, comprising a large, flat head attached to a handle, can apply a great impulse due to its large size and distribute force over a wide area. The sledgehammer is commonly used by police forces to gain entry by force during in raids on property. The entry is commonly accomplished by forcing entry through one or more doors.

Battering rams comprise a large heavy metal ram carried by two people and propelled to apply a force against an obstacle. Battering rams are commonly used by SWAT teams, military personnel, or similar groups for forcibly opening locked doors to gain entry to a structure. Other modern battering rams include a cylinder in which a piston gets fired automatically upon impact, which enhances the momentum of the impact significantly.

Hammers are a smaller version of sledgehammers, thus being significantly more portable. Hammers are often used to gain entry through weaker wooden doors or windows.

A duck-billed lock breaker is an all steel tapered head designed to be placed in the shackle of a padlock and when hit with a mallet or the back of an axe easily spreads the shackle open.

Examples of prying tools include a Halligan bar, an adz bar and a pry bar.

The Halligan bar is a specialty tool commonly used by fire and rescue personnel. The Halligan is a multi-purpose prying tool consisting of a claw (or fork), a blade, and a pick, which is especially useful in quickly breaking through many types of locked doors. The fork end of the tool can be used to break in through an outward swinging door by forcing the tool between the door and doorjamb and prying the two apart. Along with the K-tool and the adz or fork end a lock can easily be pulled. There are many other uses of the Halligan tool, including vehicle rescue and opening of walls. A Halligan bar and an axe can be joined together to form what is known as a married set, or set of irons.

The adz bar is a tool for all operations from forcible entry, to search and overhaul. This tool is a Halligan tool, except that an adz replaces the traditional fork on the end of the bar. The adz is gently curved and thin enough to penetrate those tight spaces during forcible entry operations.

The pry bar or more informally referred to as a jimmy bar, or gooseneck is a tool comprising a metal bar with a single curved end and flattened points. A small fissure is often integrated into at least one of the two ends of the pry bar. The pry bar is generally used as a lever to either force apart two objects or remove nails. Larger pry bars are referred to as crowbars. Crowbars are commonly used for prying two (2) items assembled to one another apart, smashing objects, and the like. Crowbars can be used as any of the three lever classes but the curved end is usually used as a first-class lever, and the flat end as a 2nd class lever.

Examples of hydraulic tools include: the Rabbit Tool, the Port-A-Power and the like.

Commercially known as the rabbit tool, this is a one-piece integrated hydraulic forcible entry tool comprising an 11 lb., 13-inch long unit for cutting locks, bars and locking devices. It has stainless steel jaws with a spreading force and cutting force of 8,000 lbs. and features ¼" teeth that allow for easy placement between a door and its jamb. Using the hand operated pump, the Rabbit can spread a door 4" in 20-30 seconds.

Commercially known as the Port-A-Power, this tool is a portable pump unit associated with a 10 Ton hydraulic ram capable of creating a huge slamming force against any type of entries.

Another powered tool known in the art comprises an airless hand held hydraulic pump unaffected by gravity that continuously maintains pressure on the fluid in a dynamic reservoir chamber to enable pumping into a dynamic pressure chamber for actuating a forcing rod irrespective of the orientation of the pump. A release valve permits fluid return from the pressure chamber into the reservoir chamber. The pump can be fitted with a tool such as a door forcer.

The manual tools described above are useful for helping the firefighters and law enforcement agents to open weak doors, which can be opened using a regular lever or slamming force, but they are useless for opening strong doors. Instead, the hydraulic devices mentioned above are useful for opening strong doors, however they present the following drawbacks:

Hydraulic units create major problems by usually blowing out O-ring seals. Major leaks of oil create a dangerous spreading of toxic chemicals to the environment as well as the emission of fumes into the air. Furthermore, an extreme explosive surge is also created when seals are blown under pressure;

Secondary cylinders and hoses are required;

Hydraulics cannot be inverted with usage;

In most cases the door is ruined after it is opened;

Because of the internal fluids used in its hydraulic circuit, it cannot operate under extreme weather conditions; and They require excessive regular maintenance when is not being used.

Pneumatic devices including an inner air pressurized container are another known solution in the market. These are similar to the hydraulic ones, with the following drawbacks:

Limited time use;

Require filtering of air;

Difficult to control the movement of components using air;

Pressurized gas being extremely dangerous for use in hot or cold environments;

Constant and heavy maintenance; and

Heavy carrying accessory chargers.

Therefore, a reliable fully mechanical or powered portable forcible entry device capable of avoiding the abovementioned problems with a simple, low-maintenance and economical structure is still desired.

BRIEF SUMMARY OF THE INVENTION

This invention is directed towards a mechanical or powered hand held door opener device, light in weight and operable in any orientation, included inverted, for generating a substantial door-opening force with a minimum effort from the user.

In a first exemplary embodiment, the present invention presents a hand-held forcible entry device including:

a forcible entry device tubular housing formed having a tubular section extending along a longitudinal axis between an entry device tubular housing capped end and an entry device tubular housing operational end;

an input drive shaft rotationally assembled to the forcible entry device tubular housing, wherein the input drive shaft is oriented being generally perpendicular to the tubular housing longitudinal axis;

an input drive shaft torque application end provided at an exposed end of the input drive shaft;

a torque application bevel gear concentrically affixed to the input drive shaft providing unison rotation therewith;

a central helical pressure applicating lead screw comprising a helically shaped threaded central section extending between a lead screw drive gear engaging end and a lead screw distal end, wherein the central helical pressure applicating lead screw is rotationally assembled to the forcible entry device tubular housing, wherein the central helical pressure applicating lead screw is oriented being generally parallel to the tubular housing longitudinal axis;

a lead screw bevel drive gear concentrically affixed to the lead screw drive gear engaging end providing unison rotation therewith, wherein the lead screw bevel drive gear and the torque application bevel gear are rotationally engaged with one another;

a fixed wedge plate comprising an operating edge, the fixed wedge plate being assembled to the entry device tubular housing operational end;

a pressure generating platform threadably engaged with the helically shaped threaded central section;

a pressure applicating wedge plate comprising an operating edge; and at least one pressure applicating transfer column extending between a torque applicating end and a pressure transfer end, the torque applicating end being assembled to the pressure generating platform and the pressure transfer end being assembled to the pressure applicating wedge plate;

wherein a torque applied to the input drive shaft torque application end rotates the input drive shaft, which in turn rotates the torque application bevel gear in unison therewith, which engages and rotates the lead screw bevel drive gear, which rotates the central helical pressure applicating lead screw in unison therewith, which translates the pressure generating platform in a direction parallel to the longitudinal axis, which transfers the axial motion to the at least one pressure applicating transfer column, which moves the pressure applicating wedge plate respective to the fixed wedge plate.

In a second aspect, the operation of the hand-held forcible entry device is provided by a mechanical torque applicator.

In another aspect, the operation of the hand-held forcible entry device is provided by a powered torque applicator.

In another aspect, the operation of the powered hand-held forcible entry device further comprises a torque converting reduction gear.

In another aspect, the torque converting reduction gear comprises a series of gears to provide an output torque that is greater than an input torque.

In another aspect, the torque converting reduction gear provides an output rotational direction that is in the same direction as an input rotational direction.

In yet another aspect, the fixed wedge plate further comprising at least one fixed wedge plate drive column clearance bore, wherein each of the at least one pressure applicating transfer column passes through a respective at least one fixed wedge plate drive column clearance bore.

In yet another aspect, the fixed wedge plate further comprising a fixed wedge plate foot, wherein the operating edge is formed along an edge of the fixed wedge plate foot.

In yet another aspect, the pressure applicating wedge plate further comprising a fixed wedge plate foot clearance, wherein the fixed wedge plate foot nests within the fixed wedge plate foot clearance.

In yet another aspect, the pressure applicating wedge plate further comprising a fixed wedge plate foot exposed surface and the pressure applicating wedge plate comprising a pressure applicating wedge plate exposed surface, wherein the fixed wedge plate foot exposed surface and the pressure applicating wedge plate exposed surface are coplanar when the wedge plate foot is positioned nesting within the fixed wedge plate foot clearance.

In yet another aspect, the hand-held forcible entry device further comprises a plurality of pressure applicating transfer columns extending between a torque applicating end and a pressure transfer end in a spatial and parallel relation with one another.

In yet another aspect, the hand-held forcible entry device further comprises a stationary thrust platform being assembled to the forcible entry device tubular housing, wherein the lead screw drive gear engaging end is rotationally supported by the stationary thrust platform; and the lead screw distal end is rotationally supported by the fixed wedge plate.

This invention provides major advantages over current similar technologies. The following are just some of the benefits incorporated by the use of the present invention:

- The unit is 100% mechanical, no hydraulics (oil) or pneumatics (air) involved;
- No hoses necessary;
- Unlimited shelf life;
- No maintenance. All mechanical parts for longer life use;
- Lighter in weight;
- High impact resistant for very abusive environments and industries, including fire departments, military, police, the DEA, SWAT, FBI and CIA;
- Specialized components that develop high thrust with light operational functions;
- Thrust and compressive structure can be approximately eight (8) times more than a thrust level required to open the most difficult entry system;
- Water resistant;
- The unit is made of high-impact and heat treated materials specifically designed for use in harsh environments;
- Various attachments can be installed for various operations and activities such as: pressure-breaking locks, opening locked doors (of all sorts), locking or wedging and jacking applications;
- All the interior structured components and systems are achieved by non-standard components in order to be able to develop the thrust and force that this unit can perform. Each of these components is specifically designed to work with each other to achieve the desired output;
- Within 'ANSI' standards;
- It's environmentally friendly or 'green' as it is totally inert and mechanical, no oils or 'O' ring blow outs with the consequent spillage of toxic chemicals or fumes to the environment;
- Compact and light design, less storage space necessary;
- Shorter self contained;
- Greater thrust than other units on the market;
- It can be operated by only one person;
- In most cases the door is not ruined after it is opened;
- Any type of door system can be opened: solid core doors, metal doors, steel industrial doors, swing-in and swing-out doors, etc.
- It has a high 'IZOD' impact rating;
- The unit is manufactured and can be used as a 'user friendly' and one-man operational unit; and
- The unit is designed and can operate in extreme hot or cold environments, from −20° F. to +290° F.

In summary, the present invention is referred to as a hand-held forcible entry device, comprising an outer tube with at least one lateral hole, to the lateral walls of the outer tube a couple of bearings are fastened, to the bearings a drive shaft is rotationally mounted to which an activating handle is attached; inside the tube, on the shaft, a first gear and a shaft bearing are mounted; inside the aluminum outer tube at least two stationary shaft bearings are mounted; on the two stationary shaft bearings a central helical lead screw is rotationally mounted; on one end of the screw a second gear is mounted, engaged to the above mentioned first gear; on the screw, an inner platform is also mounted, capable of moving on the screw guided by attached internal columns whose axis is parallel to the screw; the end of the four columns are attached to an outer platform with a wedge-like foot attachment.

These and other aspects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, in which.

Like reference numerals refer to like parts throughout the several views of the drawings.

DETAILED DESCRIPTION OF THE PRESENT INVENTION

Figure 1:
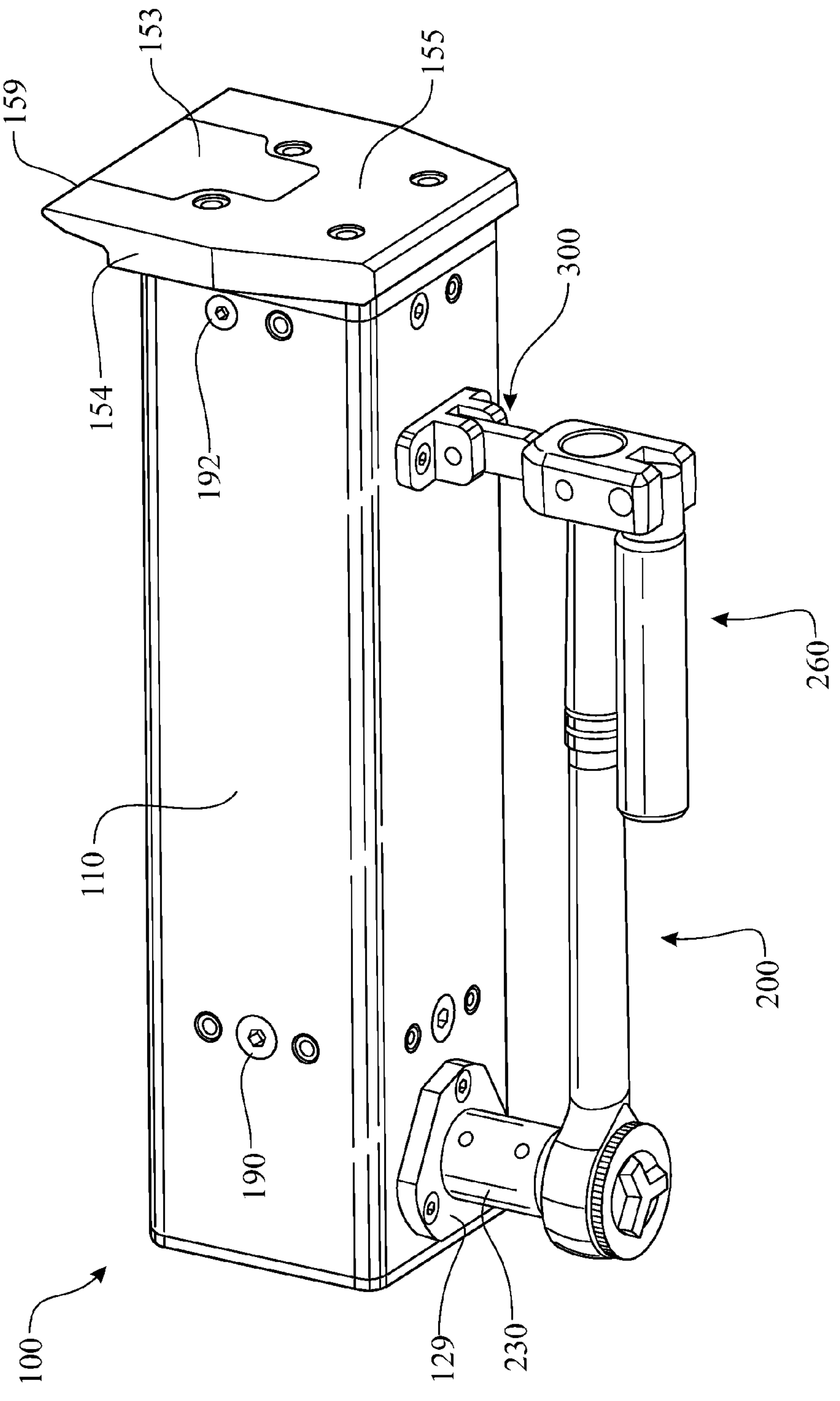
FIG. 1 presents an isometric view of a first exemplary hand held forcible entry device in accordance with the present invention, illustrated with an operational handle placed in a locked configuration.
Figure 2:
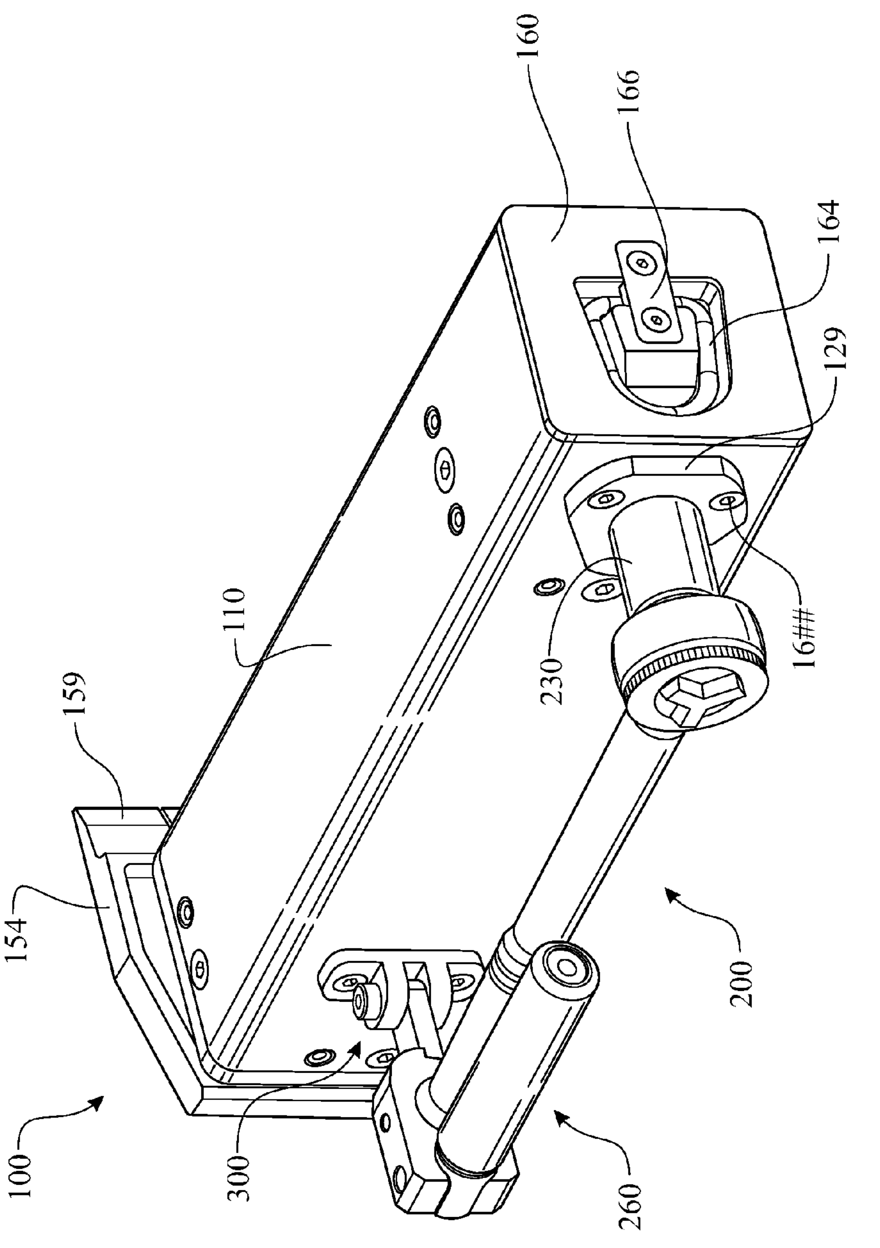
FIG. 2 presents a second isometric view of the hand held forcible entry device originally introduced in FIG. 1, wherein the illustration details an upper end thereof, introducing a carrying ring recessed into the face of the upper cap.
Figure 3:
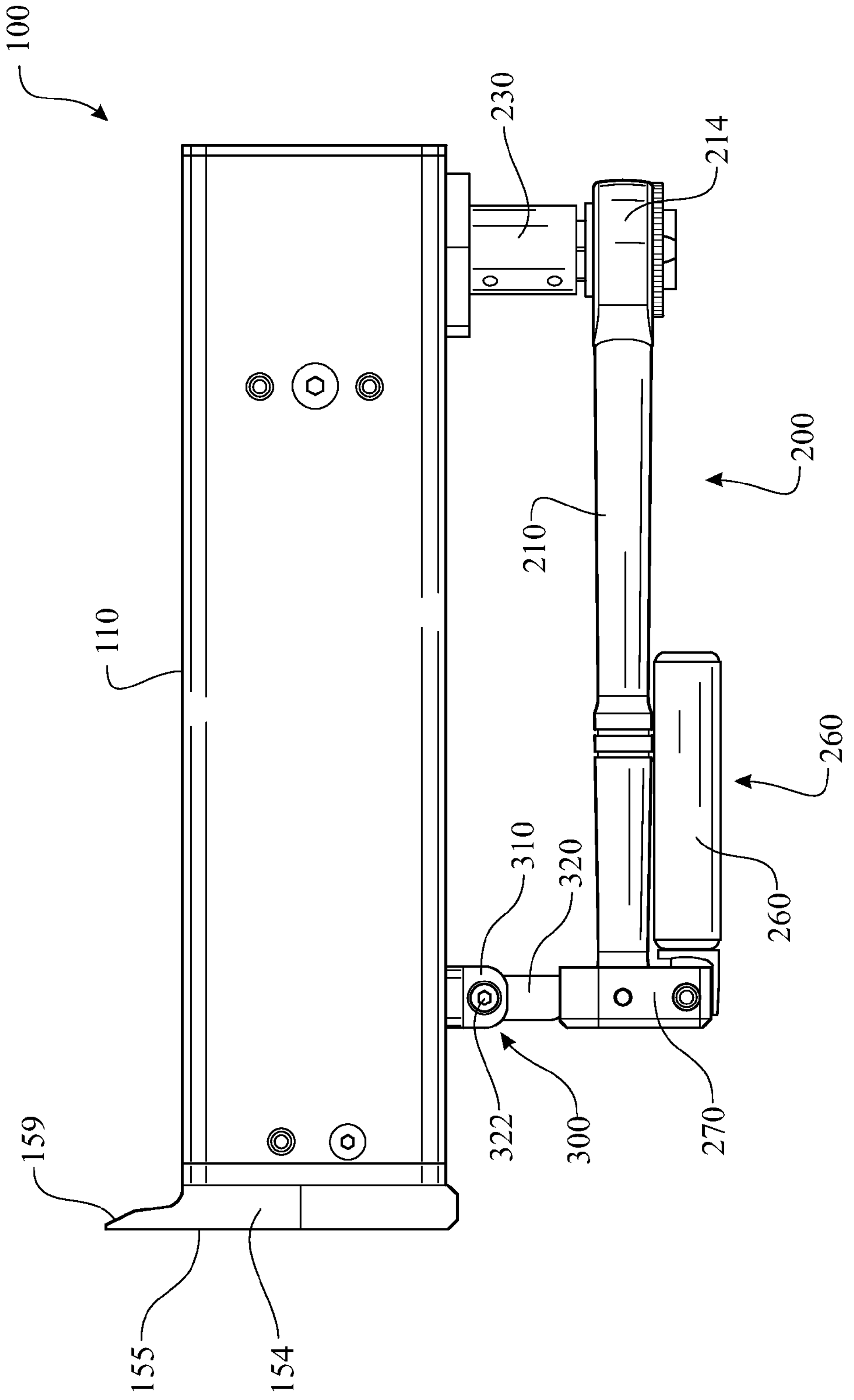
FIG. 3 presents a side elevation view of the first exemplary hand held forcible entry device originally introduced in FIG. 1, detailing a lateral handle comprising a ratchet mechanism.
Figure 4:
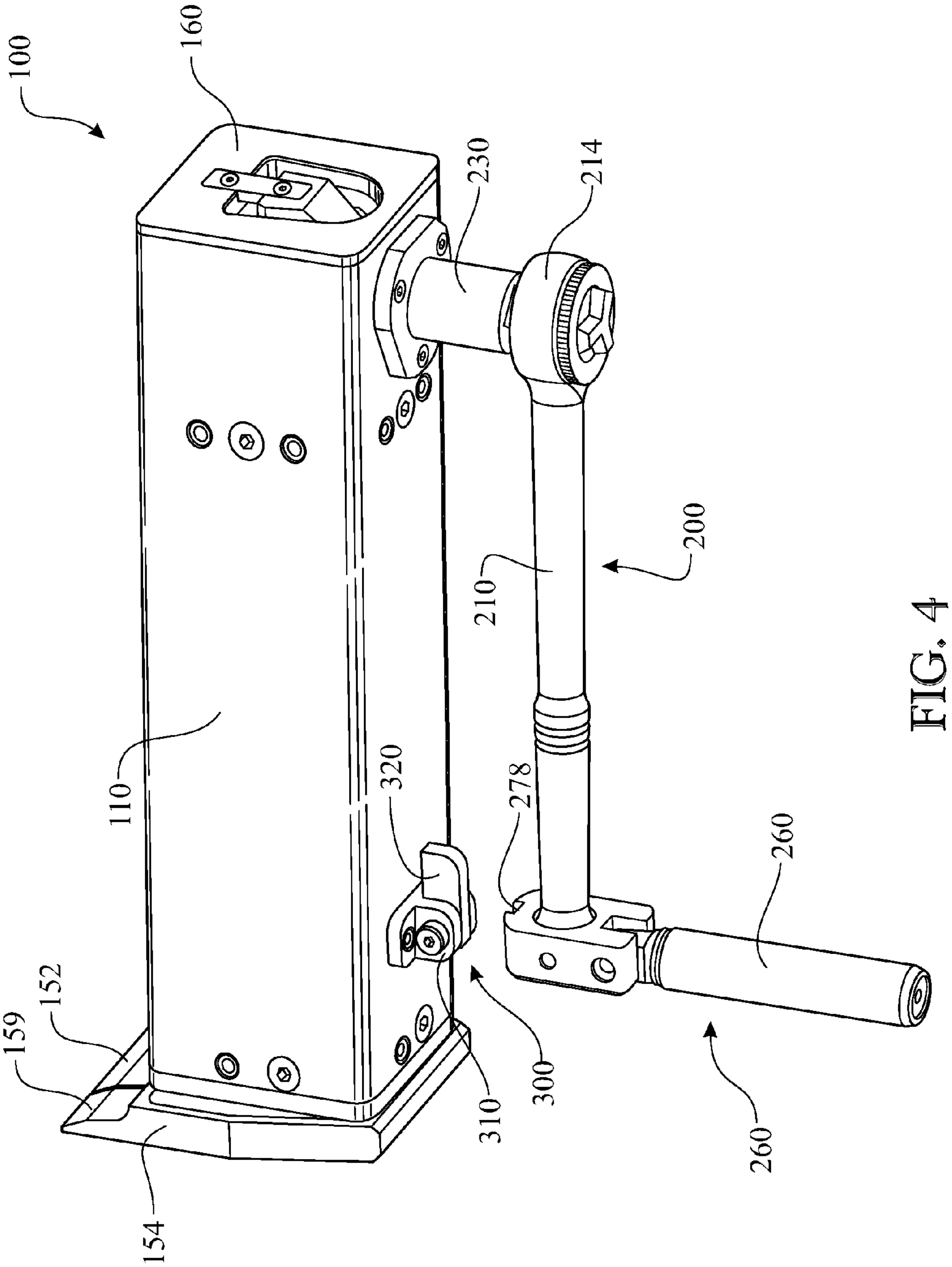
FIG. 4 presents another isometric view of the first exemplary hand held forcible entry device originally introduced in FIG. 1, wherein the illustration presents a locking mechanism for securing the operational handle, wherein the locking mechanism is shown in an unlock position.
Figure 5:
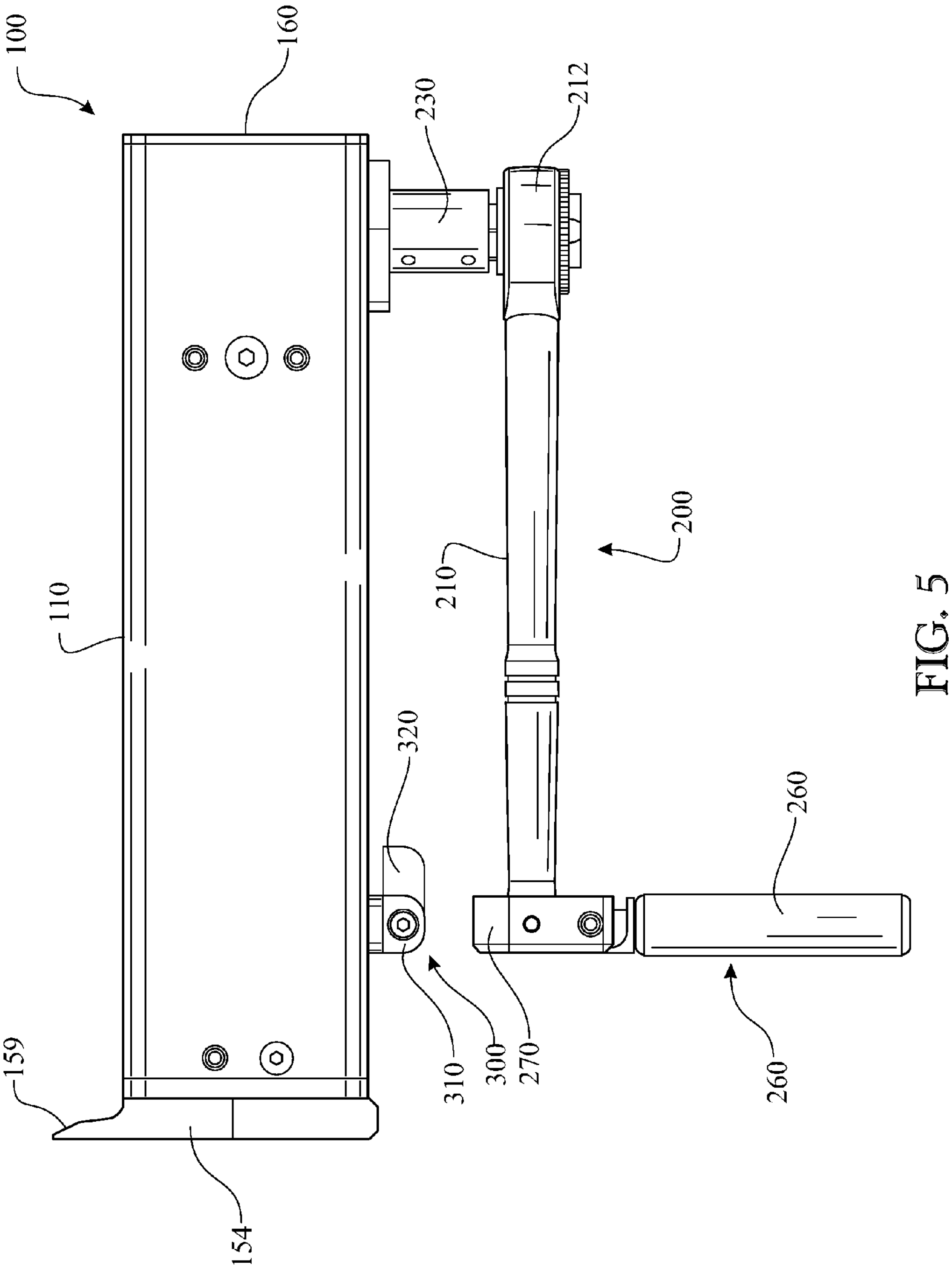
FIG. 5 presents a side elevation view of the first exemplary hand held forcible entry device originally introduced in FIG. 1, wherein the illustration presents a locking mechanism for securing the operational handle, wherein the locking mechanism is shown in an unlock position.

Detailed embodiments of the present invention are disclosed herein. It will be understood that the disclosed embodiments are merely exemplary of the invention that may be embodied in various and alternative forms. The figures are not necessarily to scale, and some features may be exaggerated or minimized to show details of particular embodiments, features, or elements. Specific structural and functional details, dimensions, or shapes disclosed herein are not limiting but serve as a basis for the claims and for teaching a person of ordinary skill in the art the described and claimed features of embodiments of the present invention. The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

An exemplary embodiment of a mechanically operated hand-held forcible entry device 100 is presented in FIGS. 1 through 18. The mechanically-operated hand-held forcible entry device 100 is a mechanically operated device used to forcibly separate a closure (such as a door, a window, a gate, and the like) and a respective closure frame (such as a door frame, a window frame, a fence, and the like) from one another, thus dislodging the locking mechanism extending between the closure and the respective closure frame. The mechanically-operated hand-held forcible entry device 100 is an assembly comprising several interacting subassemblies, including a torque input drive shaft subassembly, which engages with a pressure applicating lead screw subassembly, which drives a pressure generating subassembly to generate a separation force applied by a separation of a fixed wedge plate 150 and a pressure applicating wedge plate 154. The operational subassemblies are integrated into an entry device tubular housing 110. A torque is applied to the torque input drive shaft subassembly by an operational drive ratchet 200.

The entry device tubular housing 110 is manufactured of a tubular section of rigid material, such as a tubular 3"×3" square section having a predetermined length. The raw material used for the entry device tubular housing 110 can be fabricated of any suitable material including aluminum, plastic, steel, composites, and the like using any suitable process, including an extrusion process, a molding process, and the like. Orientation of the entry device tubular housing 110 can be referenced by an entry device tubular housing first sidewall 112 and an entry device tubular housing second, opposite sidewall 114. An entry device tubular housing interior 115 (FIG. 17) is defined as the interior surface of the sidewalls 112, 114, and the like. The entry device tubular housing 110 is cut to a length extending between an entry device tubular housing capped end 118 and an entry device tubular housing operational end 119. The entry device tubular housing 110 is subsequently machined to form a drive assembly port 116 through the entry device tubular housing first sidewall 112 at a location proximate the entry device tubular housing capped end 118. A series of countersunk or counter bored holes for insertion of mechanical fasteners such as threaded screws, bolts, rivets, and the like are formed through the sidewalls of the entry device tubular housing 110 in locations respective for assembly of various components thereto. A fixed wedge plate 150 is affixed to the entry device tubular housing operational end 119 of the entry device tubular housing 110 by inserting mechanical fasteners through holes located through the sidewall of the entry device tubular housing 110 and engage with mating formations provided within the fixed wedge plate 150. In the exemplary embodiment, the fastener mating formations are provided through a side surface of an axially oriented seat of the fixed wedge plate 150. A tubular housing cover 160 is affixed to an opposite, entry device tubular housing capped end 118 of the entry device tubular housing 110 by inserting mechanical fasteners through holes located through the sidewall of the entry device tubular housing 110 and engage with mating formations provided within the tubular housing cover 160. In the exemplary embodiment, the fastener mating formations are provided through a side surface of an axially oriented seat of the tubular housing cover 160. A lifting ring 164 is pivotally assembled to the tubular housing cover 160 using a lifting ring retention member 166 and respective mechanical fasteners (not shown). It is understood that the lifting ring 164 can be any suitable design and material and assembled to the tubular housing cover 160 or entry device tubular housing 110 using any reasonable attachment interface known by those skilled in the art, wherein the attachment interface would be based upon the elected form factor of the lifting ring 164. A housing cover ring receiving recess 162 is formed within the tubular housing cover 160 for stowing the lifting ring 164 when not in use.

Figure 17:
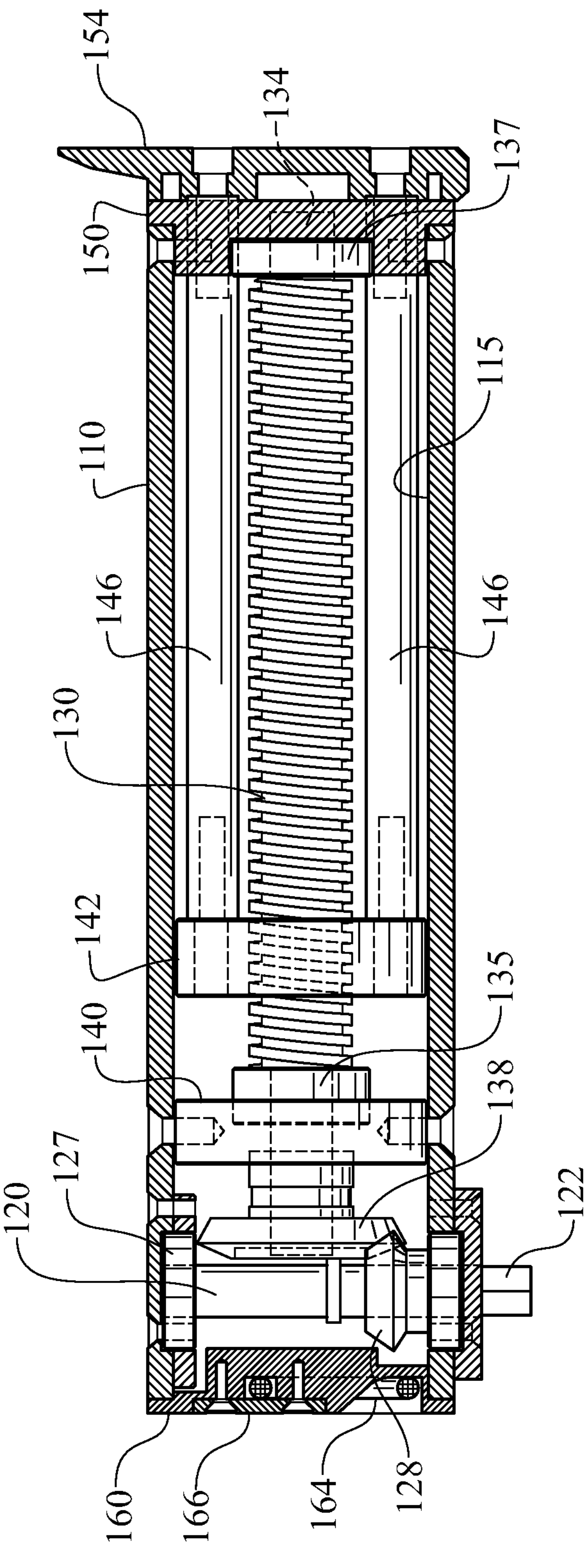
FIG. 17 presents a longitudinal side sectional view of the hand held forcible entry device originally introduced in FIG. 1.
Figure 18:
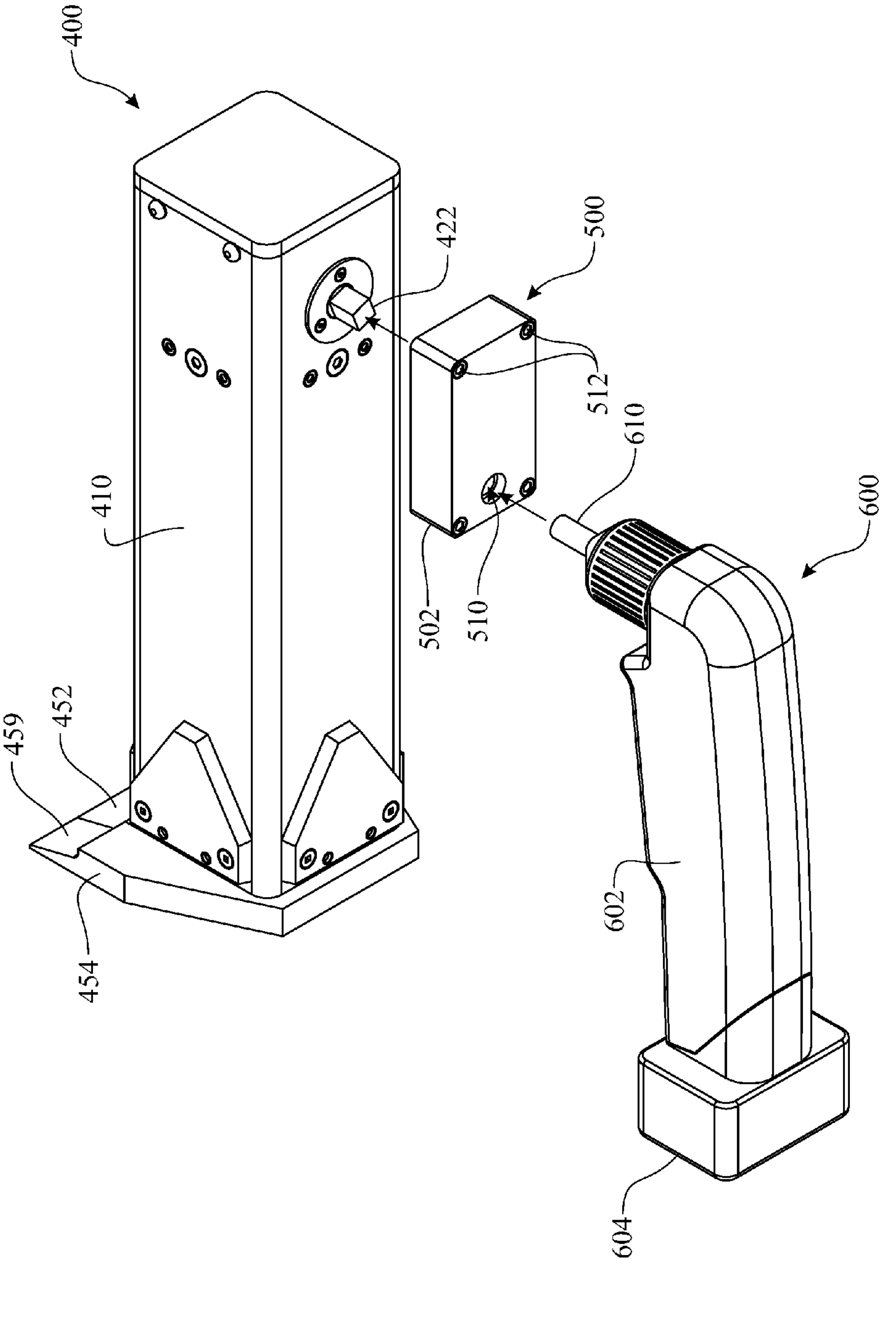
FIG. 18 presents an isometric partially exploded view of a second exemplary hand held forcible entry device in accordance with the present invention, introducing components of an operational powered drive system.
Figure 19:
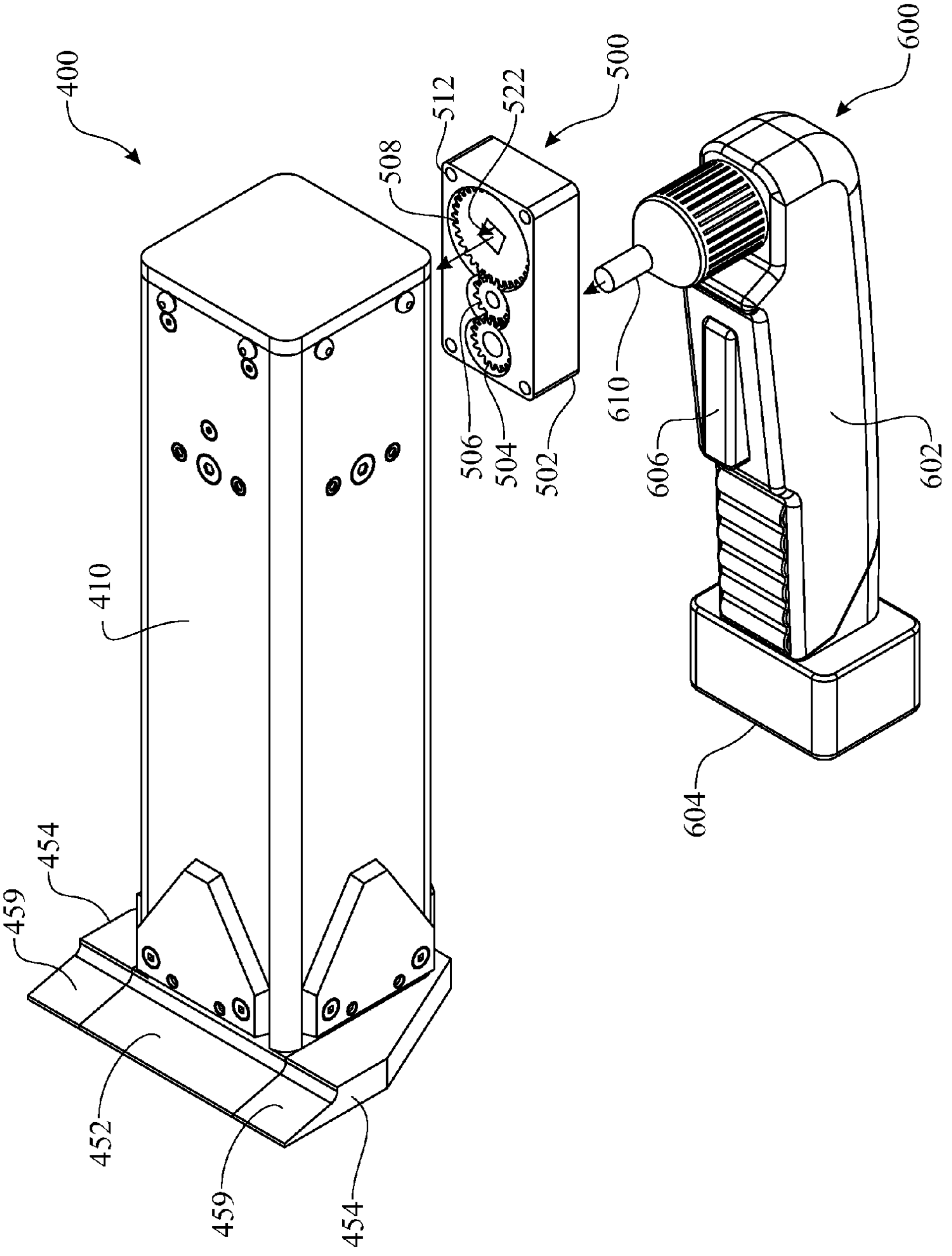
FIG. 19 presents an alternative isometric partially exploded view of the hand held forcible entry device originally introduced in FIG. 18, detailing a toque converter and powered driver of the operational powered drive system.
Figure 20:
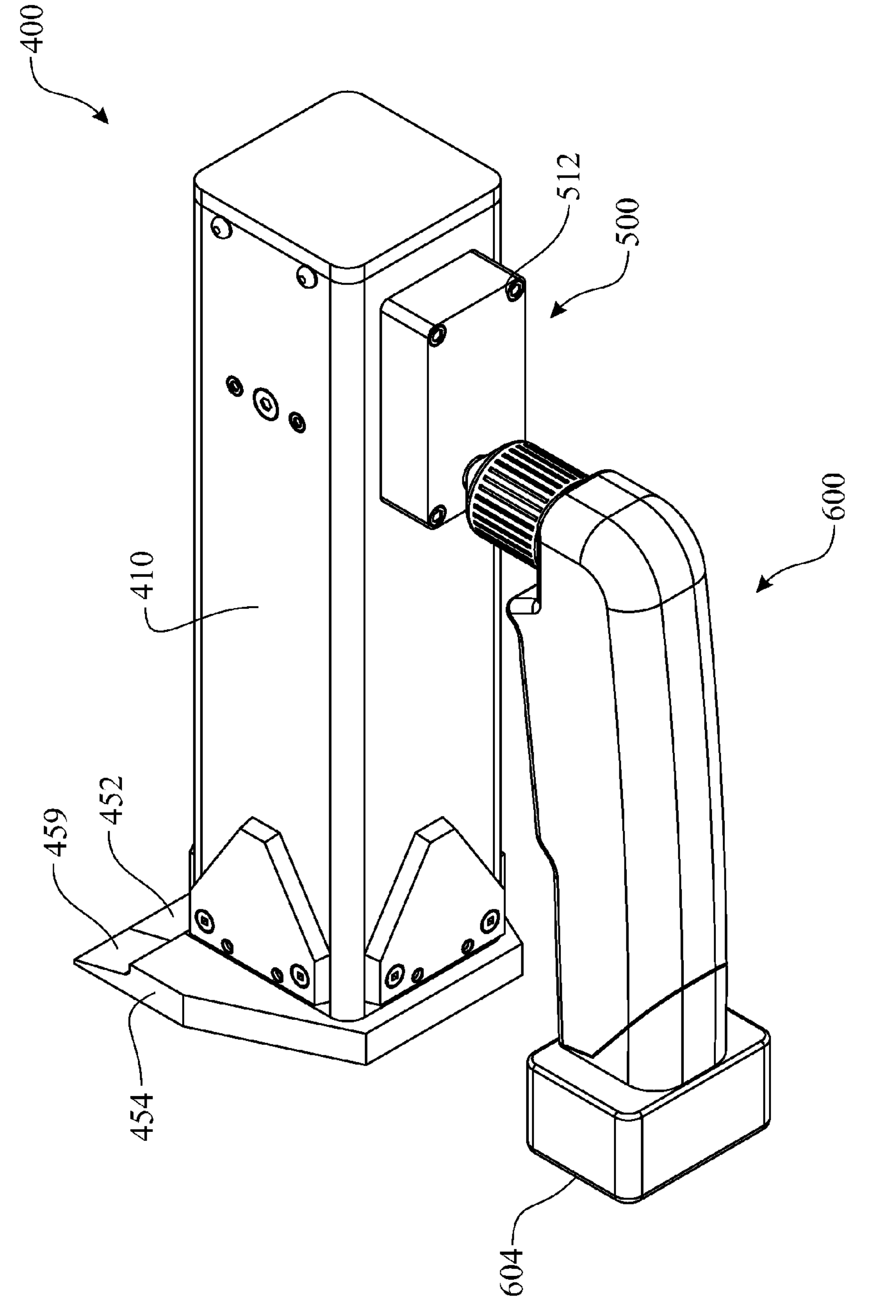
FIG. 20 presents an assembled isometric view of the hand held forcible entry device originally introduced in FIG. 18.

Details of the input drive shaft subassembly are presented in FIGS. 6 through 12 and best shown in an assembled configuration in the cross sectioned view illustrated in FIG. 17. The input drive shaft subassembly comprises a torque application bevel gear 128 assembled to an input drive shaft 120. The input drive shaft 120 rotates about an "X" axis. The input drive shaft 120 is rotationally assembled to the entry device tubular housing 110 by a pair of bearings 125, 127. The input drive shaft torque bearing 125 is affixed to the entry device tubular housing 110 by an input shaft torque bearing cover plate 124, which is assembled to an exterior surface of the entry device tubular housing first sidewall 112 of the entry device tubular housing 110 by a series of mechanical fasteners, such as the input drive shaft support fastener 196 illustrated in FIG. 2. The input drive shaft torque bearing 125 is seated within a cavity within the input shaft torque bearing cover plate 124. Similarly, the input drive shaft retention bearing 127 is affixed to the entry device tubular housing 110 by a retention bearing cover plate 126, which is assembled to an interior surface of the entry device tubular housing second, opposite sidewall 114 of the entry device tubular housing 110 by a series of mechanical fasteners, similar to the input drive shaft support fastener 196 illustrated in FIG. 2. The torque application bevel gear 128 includes a beveled gear section concentrically formed about a central bore passing therethrough. The torque application bevel gear 128 is affixed to a central region of the input drive shaft 120. The torque application bevel gear 128 is assembled to the input drive shaft 120 in a manner wherein the two components 120, 128 rotate in unison. The input drive shaft 120 can include any known feature to retain the input drive shaft 120 from any undesirable axial motion.

It is understood that the input shaft torque bearing cover plate 124 may be used in conjunction with or replaced by a input drive shaft support 129, wherein the input drive shaft support 129 would be assembled to an exterior surface of the entry device tubular housing 110.

Details of the pressure applicating lead screw subassembly are presented in FIGS. 6 through 12 and best shown in an assembled configuration in the cross sectioned view illustrated in FIG. 17. The input drive shaft subassembly comprises a lead screw bevel drive gear 138 assembled to a central helical pressure applicating lead screw 130. The central helical pressure applicating lead screw 130 rotates about a "Y" axis, wherein the "Y" axis is generally perpendicular to the "X" axis. The central helical pressure applicating lead screw 130 includes a lead screw drive gear engaging end 132 extending concentrically and axially from a drive end of the central helical pressure applicating lead screw 130 and a lead screw distal end 134 at an opposite pressure application end of the central helical pressure applicating lead screw 130. The central portion of the central helical pressure applicating lead screw 130 includes a helical screw for engagement with a stationary thrust platform central aperture 141 of a pressure generating platform 142. The helical screw is designed and shaped having non stranded tooth lines as well as variations of cross-sectional profiles, which project from an actual three-dimensional shape of the gear teeth. The cross sectional shape of the teeth, along with the specific angular gear pitch of both the cross sectional profile and specific tool line (curve) creates a unique smoothness of operation of the gears, with less wear and breakage. The design of the helical teeth and respective platform threaded aperture 143 is a major factor in the creation of a smoother, stronger and more efficient gear action. Moreover, the central helical pressure applicating lead screw 130 is designed having innovative variations from several known lead screws that fall under ISO standards. The central helical pressure applicating lead screw 130 preferably incorporates a right hand clockwise operational rotation, a new thread angle developed with a new pitch. The angle and non-ISO standard trapezoidal thread form developed is manufactured by single point form tool method. Thus the screw can carry much greater loads than similar looking units, as well as reducing wear on the mating platform threaded aperture 143. Additionally, internal thread diameters have been adjusted for both male and female components to a non-standard design to decrease weight, while maintaining substantial strength.

Figure 6:
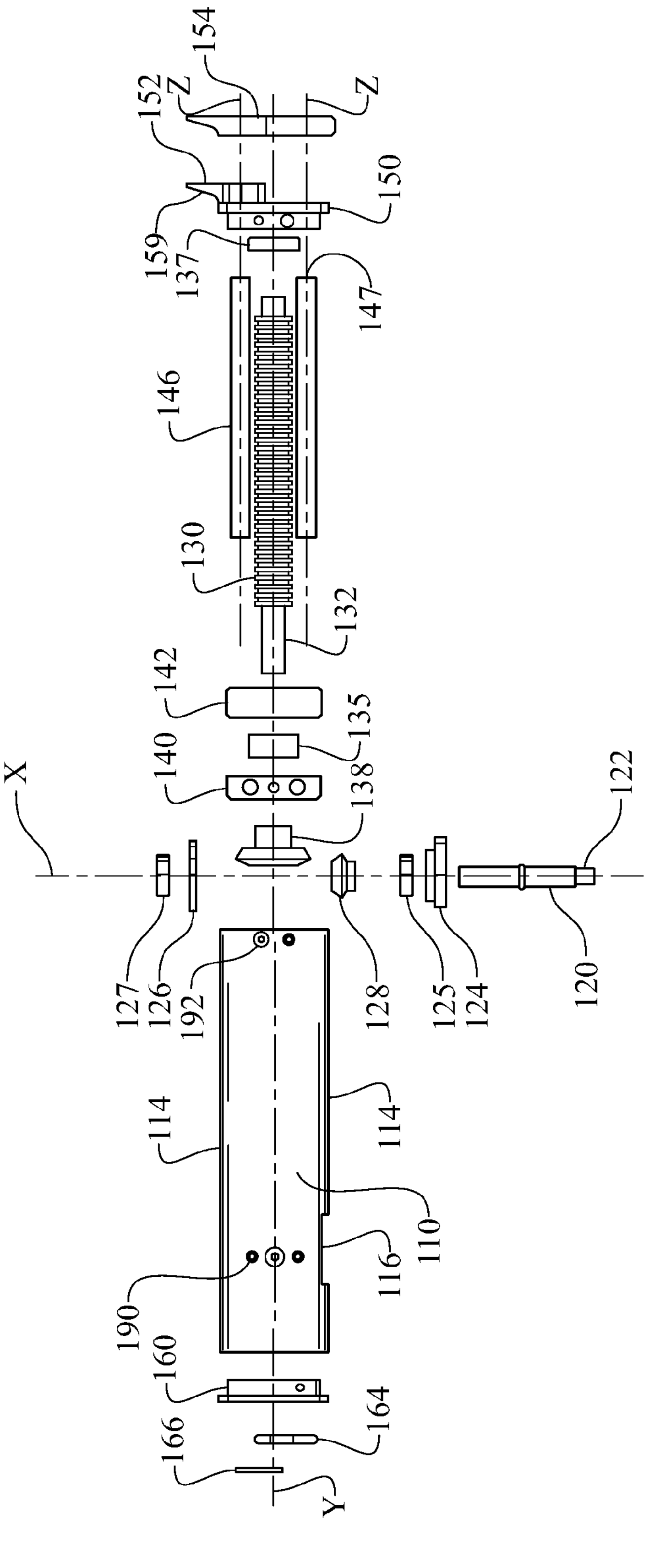
FIG. 6 presents a top exploded assembly plan view of the hand held forcible entry device originally introduced in FIG. 1, introducing the internal operational components of the first exemplary hand held forcible entry device originally introduced in FIG. 1.
Figure 7:
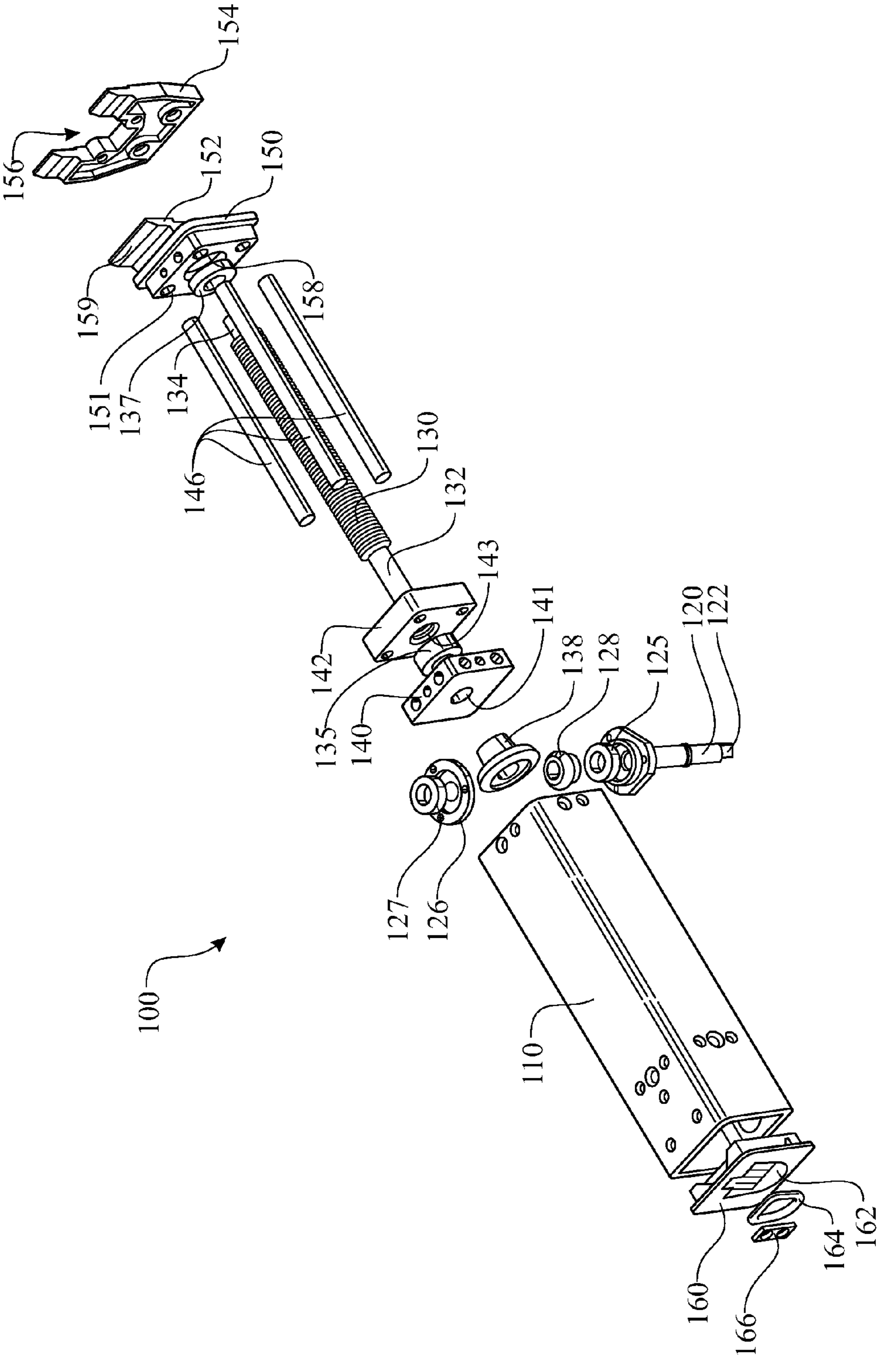
FIG. 7 presents a first isometric exploded assembly view of the hand held forcible entry device originally introduced in FIG. 1, detailing the internal operational components of the first exemplary hand held forcible entry device originally introduced in FIG. 1.
Figure 8:
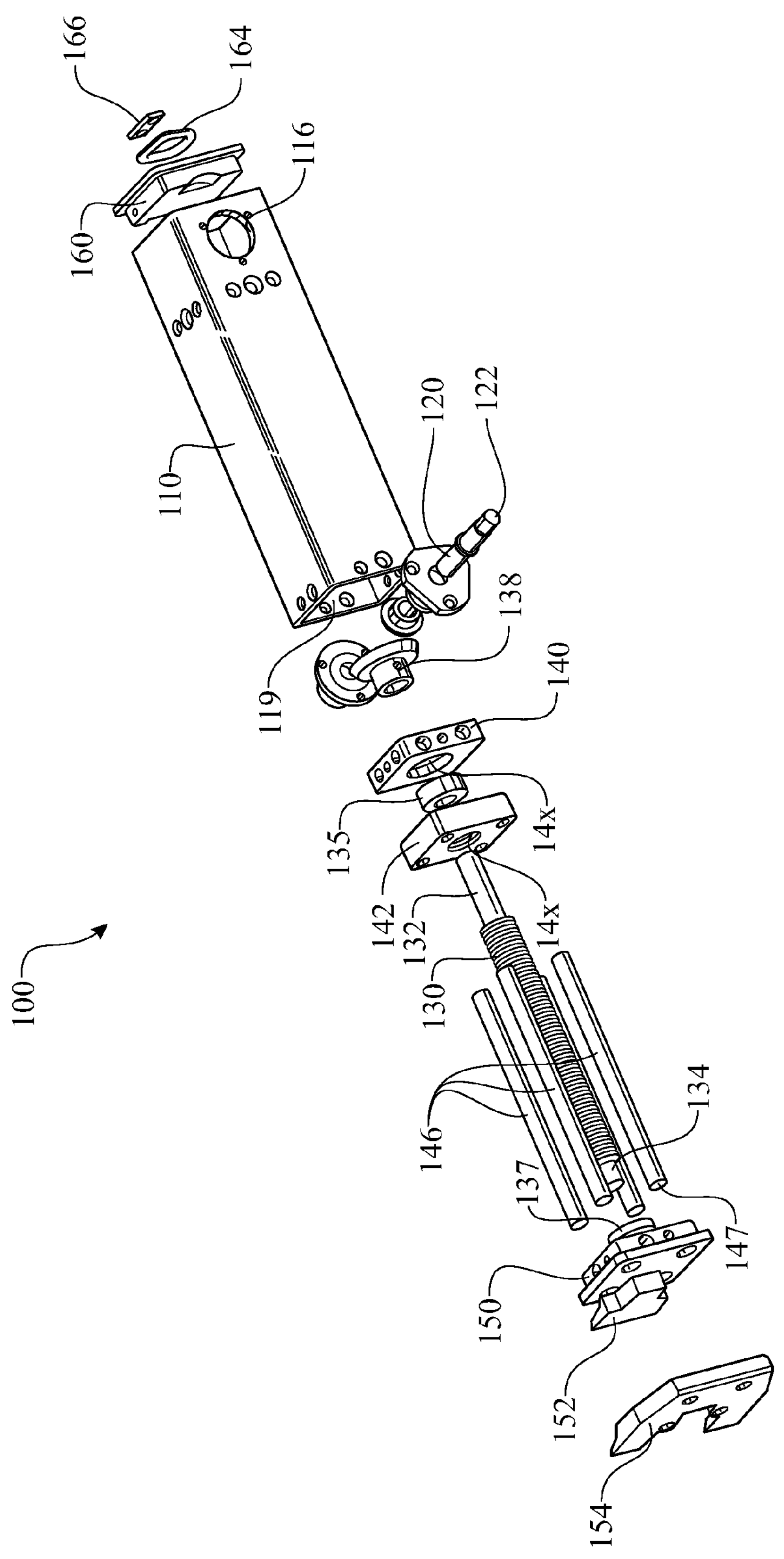
FIG. 8 presents a second isometric exploded assembly view of the hand held forcible entry device originally introduced in FIG. 1, detailing the internal operational components of the first exemplary hand held forcible entry device originally introduced in FIG. 1.
Figure 9:
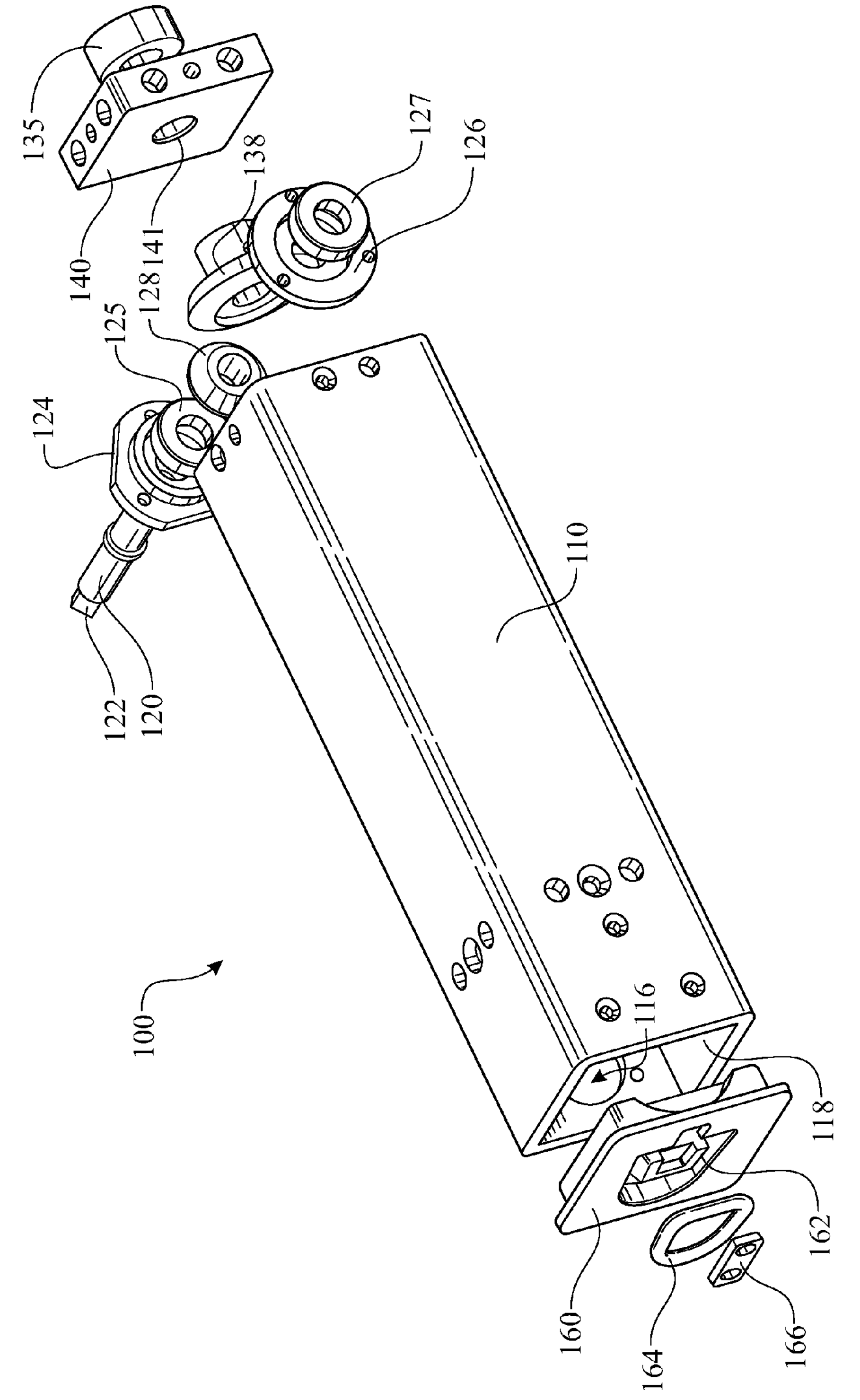
FIG. 9 presents another isometric partially exploded assembly view of the hand held forcible entry device originally introduced in FIG. 1, detailing assembly of the carrying ring to the upper cap and assembly of a pair of bevel operational gears.
Figure 10:
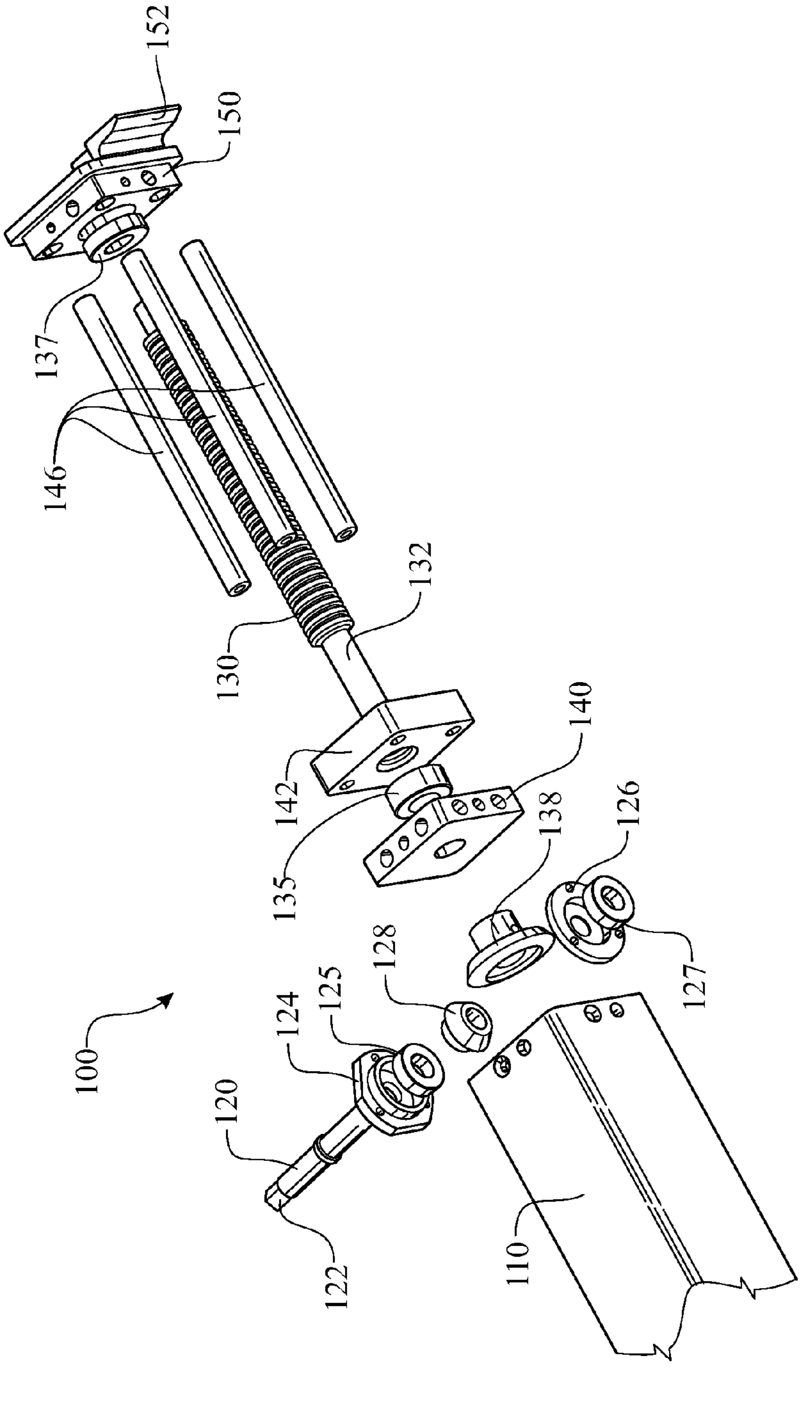
FIG. 10 presents another isometric partially exploded assembly view of the hand held forcible entry device originally introduced in FIG. 1, detailing the internal components including the bevel gears, a central helical pressure applicating lead screw, and four pressure applicating transfer columns.
Figure 11:
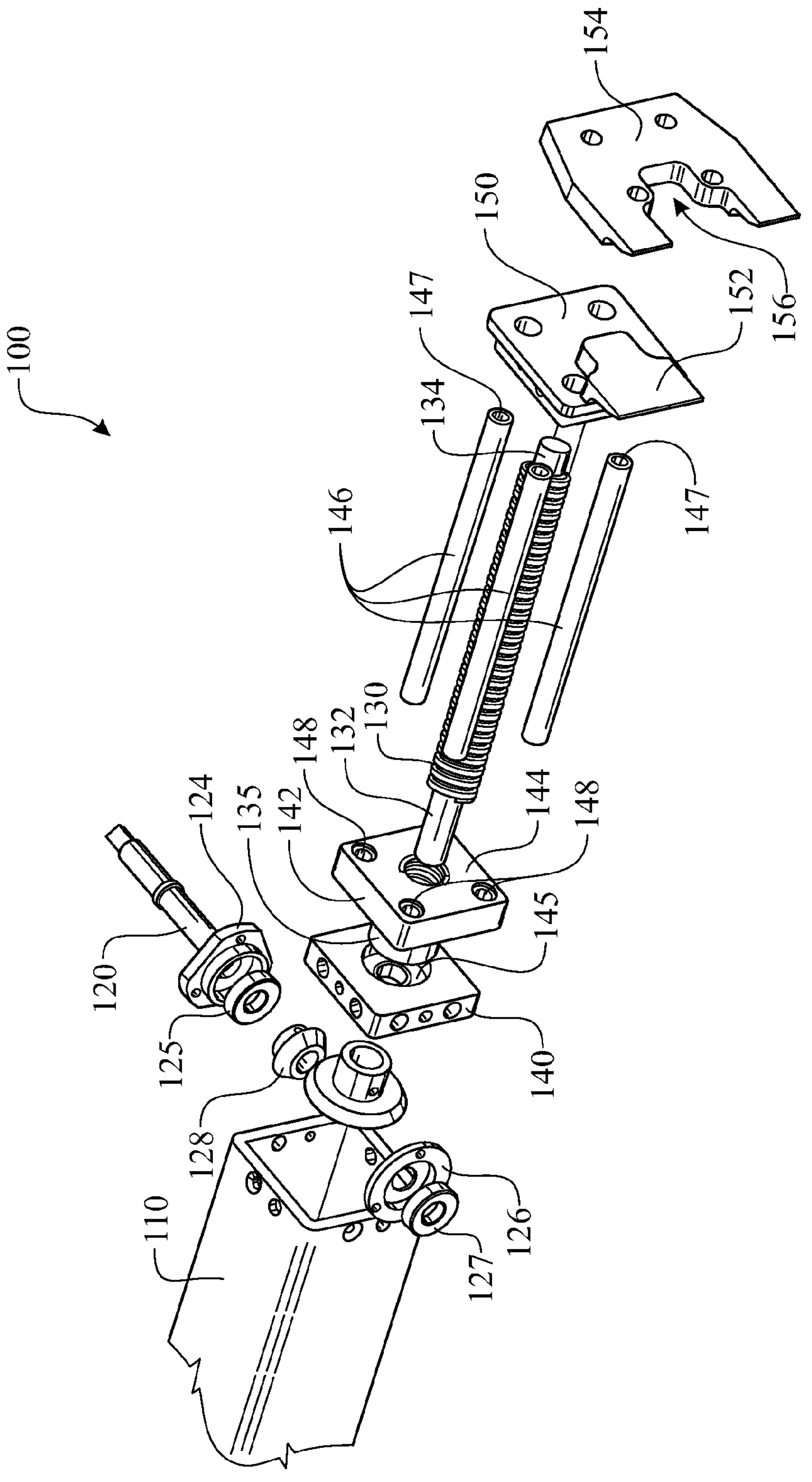
FIG. 11 presents another isometric exploded assembly view of the hand held forcible entry device originally introduced in FIG. 1, detailing a stationary thrust platform and a pressure generating platform.
Figure 12:
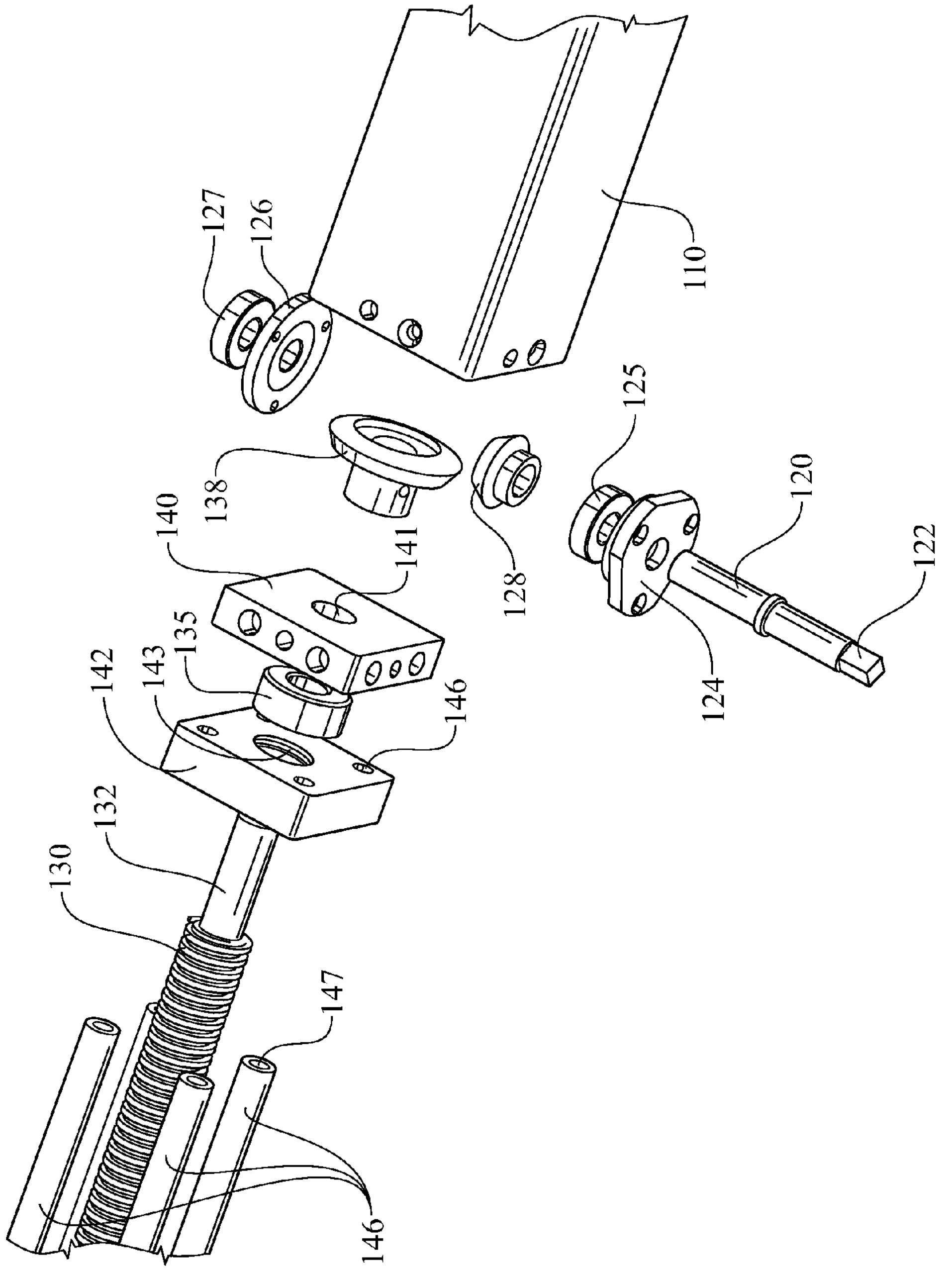
FIG. 12 presents a magnified isometric exploded assembly view of the hand held forcible entry device originally introduced in FIG. 1, detailing a relational arrangement between a torque input subassembly and pressure applicating subassembly.
Figure 13:
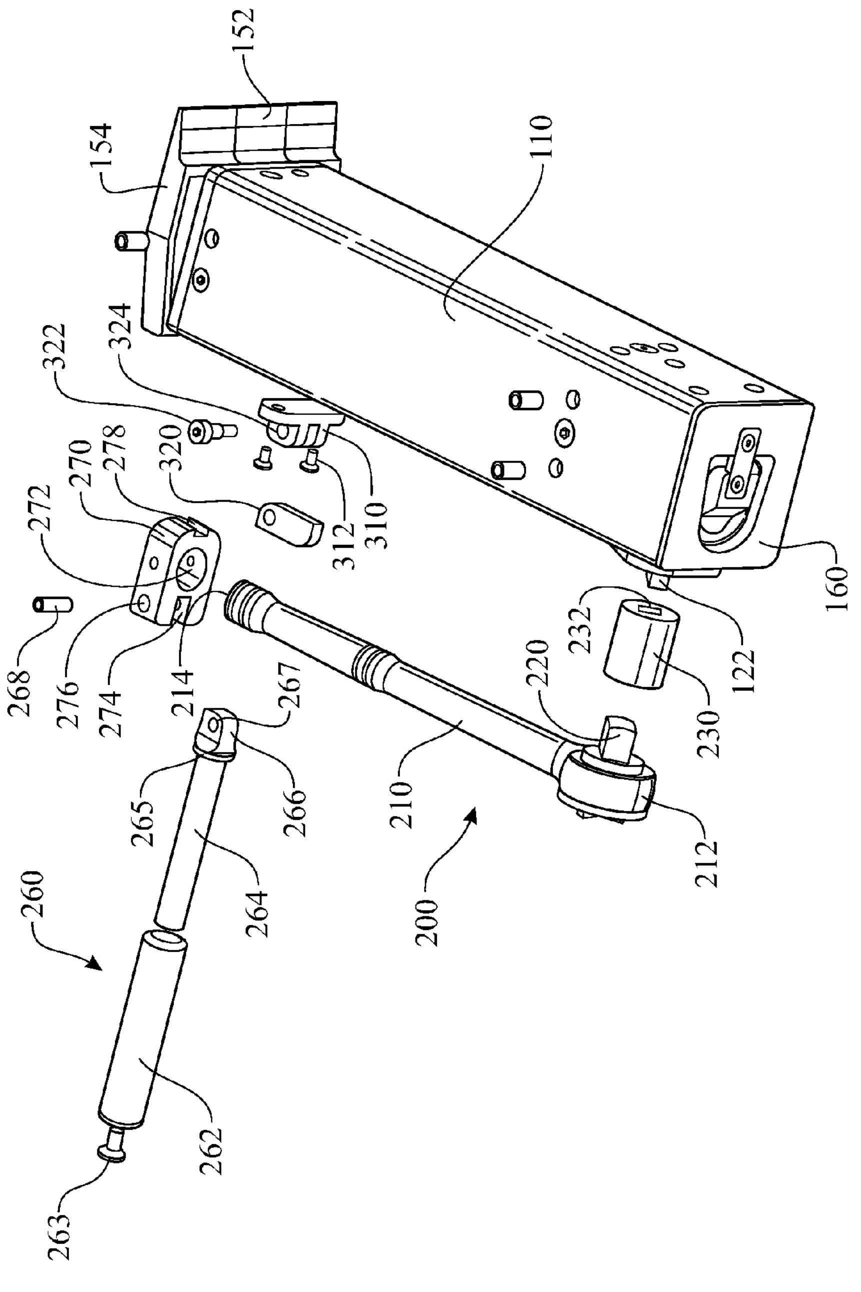
FIG. 13 presents an isometric exploded partially assembly view of the hand held forcible entry device originally introduced in FIG. 1, detailing components of a mechanical torque applicator subassembly and a respective locking subassembly.
Figure 14:
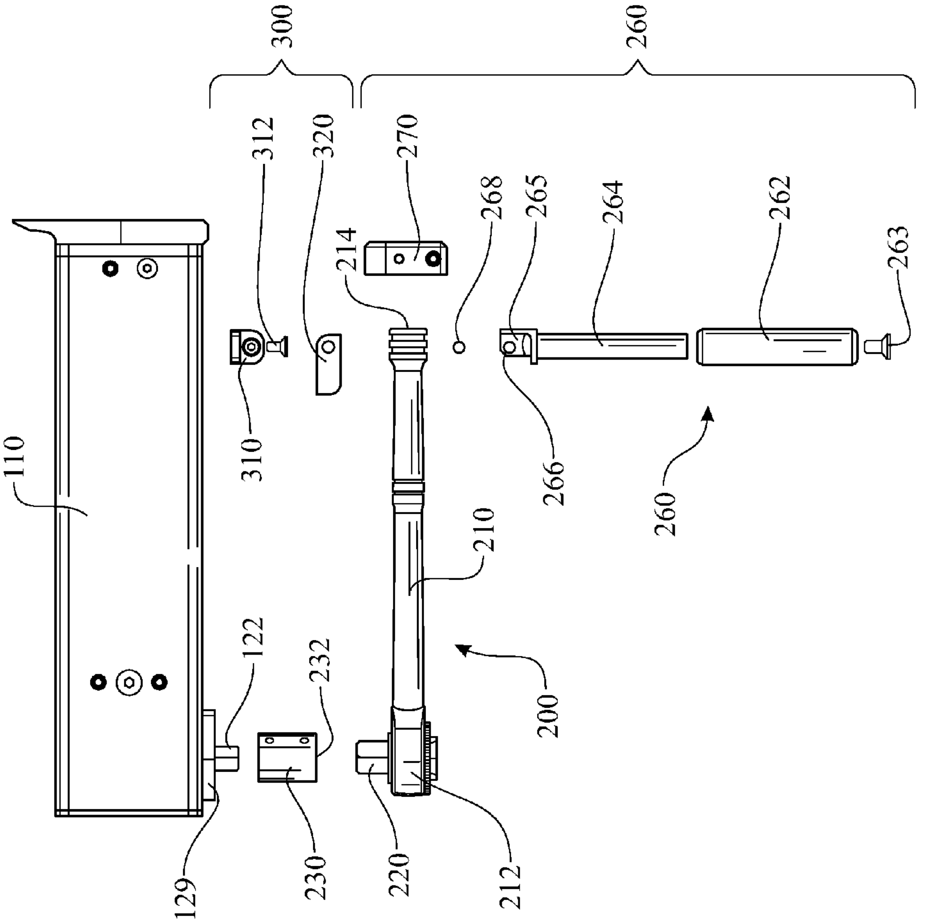
FIG. 14 presents a side elevation partially exploded assembly view of the hand held forcible entry device originally introduced in FIG. 1, detailing components of a mechanical torque applicator subassembly and a respective locking subassembly.
Figure 15:
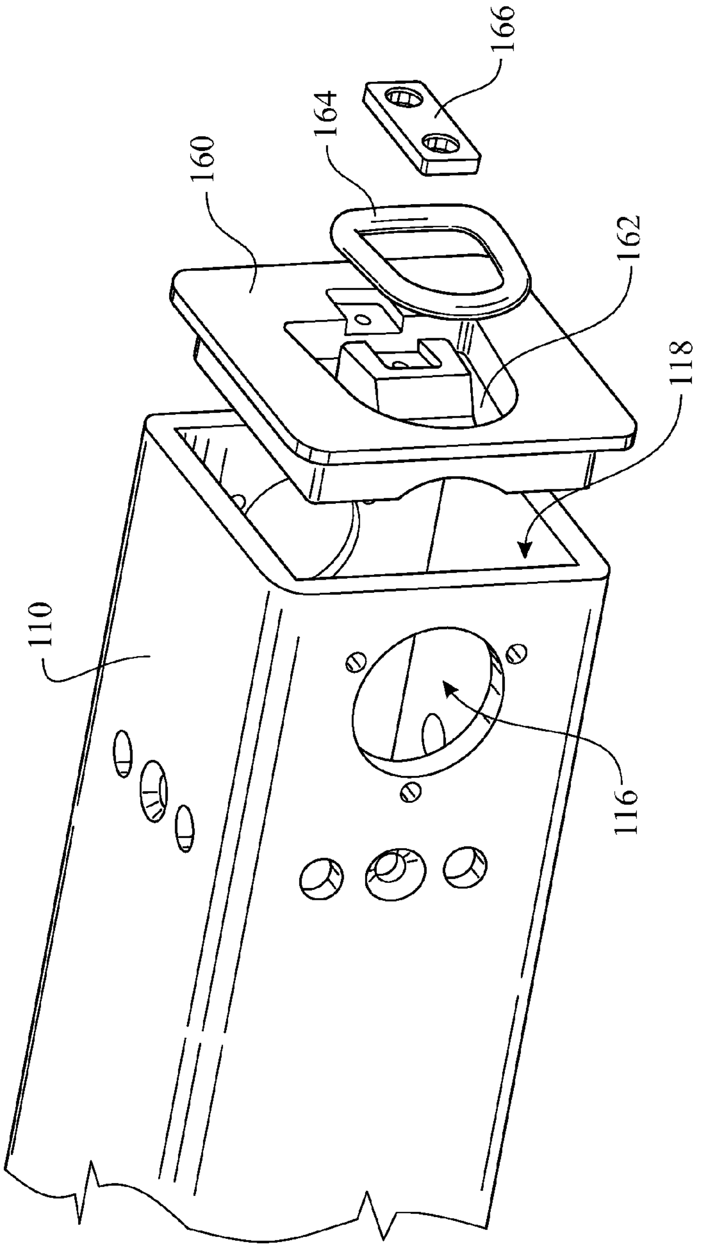
FIG. 15 presents an isometric exploded partially assembly view of a tubular housing cover region of the hand held forcible entry device originally introduced in FIG. 1, detailing components of a lifting ring pivotally assembled to a tubular housing cover.
Figure 16:
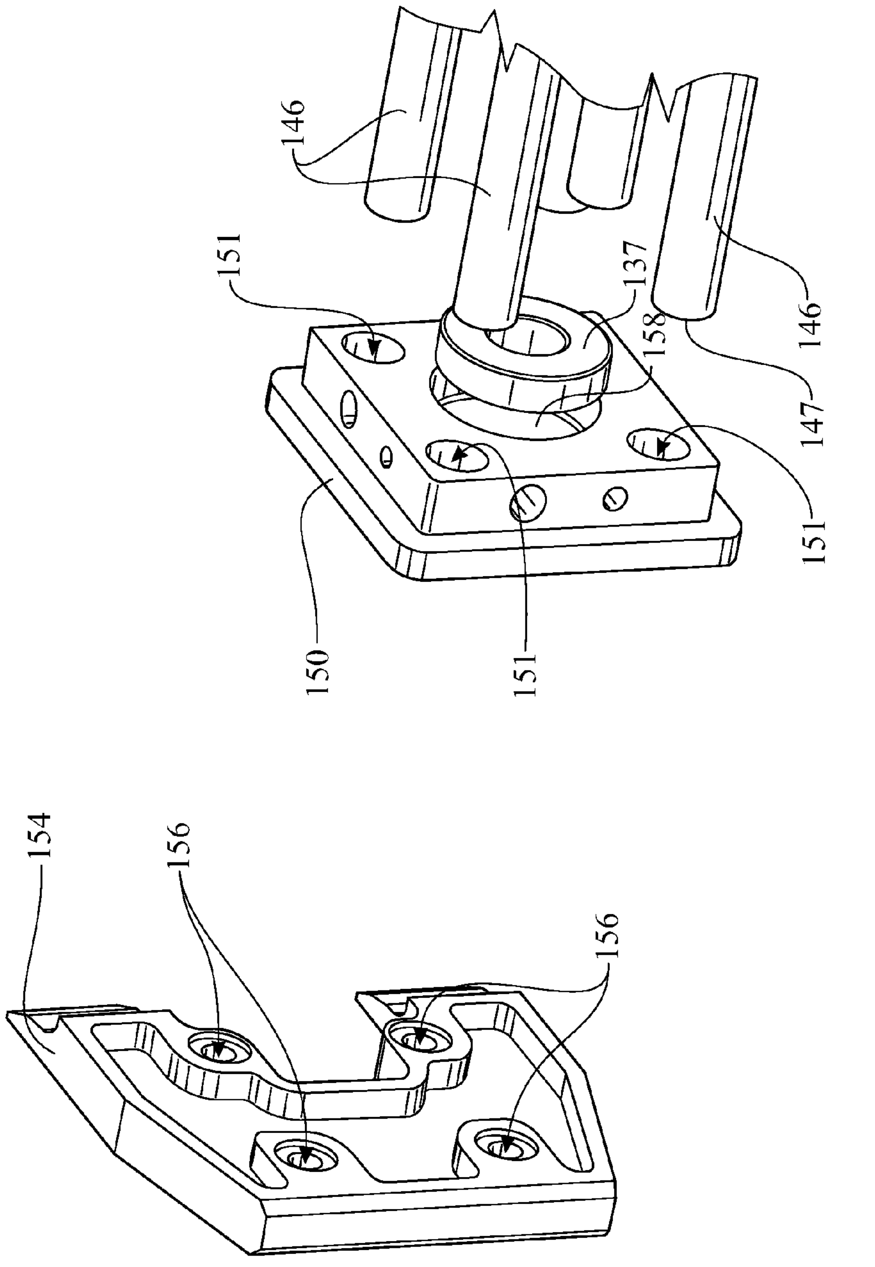
FIG. 16 presents an isometric exploded partially assembly view of a pressure applicating wedge plate and a portion of the respective operating components thereof.

The central helical pressure applicating lead screw 130 is rotationally assembled to the entry device tubular housing 110 by a stationary thrust platform 140 and a fixed wedge plate 150. The lead screw drive gear engaging end 132 of the central helical pressure applicating lead screw 130 is inserted through an interior seating surface of a lead screw gear end bearing 135. The lead screw gear end bearing 135 is seated within a pressure generating platform bearing receiving cavity 145 formed within the stationary thrust platform 140. The stationary thrust platform 140 is inserted into an interior section of the entry device tubular housing 110 and affixed by a series of mechanical fasteners, such as the input drive shaft support fastener 196 previously described. The fasteners (not illustrated) are inserted through a series of stationary thrust platform assembly apertures 190 formed through the sidewalls of the entry device tubular housing 110, wherein the stationary thrust platform assembly apertures 190 are best shown in FIG. 6. The lead screw distal end 134, at the opposite end of the central helical pressure applicating lead screw 130, is inserted through an interior seating surface of a lead screw actuator end bearing 137. The lead screw actuator end bearing 137 is seated within a fixed wedge plate bearing receiving cavity 158 formed within the fixed wedge plate 150 as best illustrated in FIGS. 7 and 15. The fixed wedge plate 150 is assembled to the entry device tubular housing operational end 119 of the entry device tubular housing 110 as described above. Mechanical fasteners are inserted through respective fixed wedge plate assembly apertures 192 assembling the fixed wedge plate 150 to the entry device tubular housing operational end 119 of the entry device tubular housing 110.

The lead screw bevel drive gear 138 includes a beveled gear section concentrically formed about a central bore passing therethrough. The lead screw bevel drive gear 138 is affixed to a distal end of the lead screw drive gear engaging end 132 of the central helical pressure applicating lead screw 130. The lead screw bevel drive gear 138 is assembled to the central helical pressure applicating lead screw 130 in a manner wherein the two components 130, 138 rotate in unison. The central helical pressure applicating lead screw 130 is restrained from any undesirable axial motion by engagement between a face of the lead screw actuator end bearing 137 and the geometric shape formed at the interface between the helical section of the central helical pressure applicating lead screw 130 and the reduced diameter of the lead screw drive gear engaging end 132 engaging with the lead screw gear end bearing 135.

The pressure generating subassembly comprises a plurality of pressure applicating transfer columns 146 extending between the pressure generating platform 142 and a pressure applicating wedge plate 154. A torque applicating end of each pressure applicating transfer columns 146 is inserted into and affixed within a column receiving countersink 148 formed within a respective platform pressure applicating face 144 of the pressure generating platform 142.

Each of the pressure applicating transfer columns 146 is slideably inserted through a respective fixed wedge plate drive column clearance bores 151 of the fixed wedge plate 150, wherein each pressure applicating transfer columns 146 slideably moves along a respective "Z" axis, wherein the "Z" axis is substantially parallel to the "Y" axis. The platform threaded aperture 143 of the pressure generating platform 142 threadably engages with the helical section of the central helical pressure applicating lead screw 130. A pressure applicating wedge plate 154 is integrated into the pressure generating subassembly by securing the pressure applicating wedge plate 154 to column pressure transfer ends 147 of the column pressure transfer ends 147. The pressure applicating wedge plate 154 can be assembled to the column pressure transfer end 147 using any known suitable assembly technique, such as mechanical fasteners, adhesives, welding, press fit assembly, and the like. In the exemplary embodiment, threaded fasteners are inserted through the mounting apertures and threadably engaged with a threaded bore formed within the column pressure transfer end 147. The mounting apertures of the pressure applicating wedge plate 154 are preferably formed a countersunk or counterbore (dependent upon style of the screw head) recessing a head of the mechanical threaded fastener.

A pressure applicating wedge plate 154 is either integrally formed with or fabricated and subsequently attached to the fixed wedge plate 150. A fixed wedge plate foot clearance 156 is included in the design of the pressure applicating wedge plate 154. The fixed wedge plate foot clearance 156 provides a clearance for the fixed wedge plate foot 152, enabling the fixed wedge plate foot 152 to nest within the fixed wedge plate foot clearance 156. When the fixed wedge plate foot 152 is nested within the fixed wedge plate foot clearance 156 of the pressure applicating wedge plate 154, a fixed wedge plate foot exposed surface 153 of the pressure applicating wedge plate 154 is co-planar with a pressure applicating wedge plate exposed surface 155 of the pressure applicating wedge plate 154. A wedge operating edge 159 of the fixed wedge plate foot 152, pressure applicating wedge plate 154 is formed having a taper for ease of insertion between two closely placed objects, such as a door and a door jam, a window and a window frame, and the like.

In operation, the input drive shaft 120 is rotated by either a manual input or a powered input. The rotational motion of the input drive shaft 120 simultaneously rotates the torque application bevel gear 128. The torque application bevel gear 128 is assembled engaging with the lead screw bevel drive gear 138, wherein when the torque application bevel gear 128 is rotated, the rotational motion of the torque application bevel gear 128 rotationally drives the lead screw bevel drive gear 138, and subsequently simultaneously rotating the central helical pressure applicating lead screw 130. The rotation of the helical section of the central helical pressure applicating lead screw 130 engages with the platform threaded aperture 143 of the pressure generating platform 142, driving the pressure generating platform 142 in either axial direction along the central helical pressure applicating lead screw 130, depending upon the rotational direction applied to the input drive shaft 120. Rotation of the input drive shaft 120 in a first direction drives the pressure generating platform 142 towards the fixed wedge plate 150; rotation of the input drive shaft 120 in a second direction drives the pressure generating platform 142 towards the stationary thrust platform 140. The motion of the pressure generating platform 142 is translated to the pressure applicating wedge plate 154 through the series of pressure applicating transfer columns 146. In one direction, the pressure applicating wedge plate 154 is driven distally from the fixed wedge plate foot 152, thus employing a forcibly entry into an object, structure, and the like.

Rotation of the input drive shaft 120 can be applied by either a manual input, as illustrated by the mechanically operated hand-held forcible entry device 100 or by a powered input, as illustrated by a powered hand-held forcible entry device 400, shown in FIGS. 18-24. The following describes the manual input embodiment, as illustrated by the exemplary mechanically operated hand-held forcible entry device 100 shown in FIGS. 1 through 17. An input drive shaft torque application end 122 is formed upon an input end of the input drive shaft 120. The input drive shaft torque application end 122 is shaped to torsionally engage with a mechanical drive input device, such as an exemplary operational drive ratchet 200.

The operational drive ratchet 200 includes a ratchet operational end 212 located at an operational end of a ratchet 210. The ratchet operational end 212 includes elements commonly known with a drive ratchet, including a ratchet gear and a respective pawl assembled within a cavity formed within the operational end of a ratchet 210. The ratchet 210 can be manufactured of chrome-vanadium steel or any other suitable material.

A faceted ratchet drive projection 220 is in operational engagement with the toothed drive gear to rotate in accordance with a first rotational motion of the ratchet 210 and retaining in position when the ratchet 210 is rotated in an opposite rotational direction. The faceted ratchet drive projection 220 extends outward from a face of the ratchet operational end 212 enabling engagement with a drive tool. In the instant invention, a drive element adapter 230 is provided as a drive tool, torsionally engaging the ratchet operational end 212 and the input drive shaft torque application end 122 with one another via a complimentary drive adaptive cavity 232. The complimentary drive adaptive cavity 232 can be provided as a bore passing concentrically through the drive element adapter 230 or as individual cavities extending concentrically inward from each end of the drive element adapter 230. As shown in the exemplary embodiment in FIGS. 13 and 14, the complimentary drive adaptive cavity 232 is a bore passing through the drive element adapter 230, wherein the faceted ratchet drive projection 220 is inserted into a complimentary drive adaptive cavity 232 and the input drive shaft torque application end 122 is inserted into the opposite end of the complimentary drive adaptive cavity 232.

Due to the nature of the orientation and arrangement of the ratchet 210 respective to the adjacent sidewall of the entry device tubular housing 110, the close proximity can be cumbersome for use. To compensate and provide additional support to the user, an extension handle assembly 260 can be adapted to a ratchet grip free end 214 of the ratchet 210, as illustrated in FIGS. 1-5, 13, and 14. The exemplary extension handle assembly 260 includes a pivotal handgrip shaft 264, which is pivotally assembled to the ratchet grip free end 214 of the ratchet 210 by an extension handgrip adaptor 270. The ratchet grip free end is seated and affixed within a ratchet receiving counterbore 272 of the extension handgrip adaptor 270. An optional rotational external handgrip 262 can be rotationally and/or telescopically assembled to a distal end of the pivotal handgrip shaft 264. The design of the rotational external handgrip 262 and respective portion of the pivotal handgrip shaft 264 can be as described herein or of any known and suitable design. In the exemplary embodiment, the rotational external handgrip 262 is assembled to the pivotal handgrip shaft 264 by a handgrip fastener 263, thus enabling a rotational motion of the rotational external handgrip 262 about a circumference of the pivotal handgrip shaft 264.

The rotational external handgrip 262 can telescope along the pivotal handgrip shaft 264, increasing a length of the handle to from approximately 8" in length (retracted) to approximately 12" in length (extended), thus increasing the torque range by a factor of 10.

An adaptor hinge formation 274 is formed extending inward from an edge of the extension handgrip adaptor 270. A mating handgrip shaft pivot assembly hinge formation 266 is formed at a handgrip shaft assembly end 265 of the pivotal handgrip shaft 264. The handgrip shaft pivot assembly hinge formation 266 is inserted into the adaptor hinge formation 274. A pivot pin 268 is preferably press fit through a pivot pin assembly bore 276 extending through the extension handgrip adaptor 270, wherein the pivot pin assembly bore 276 is oriented generally perpendicular to a plane defined by the adaptor hinge formation 274. The pivot pin 268 passes through a handgrip shaft pivot assembly bore 267 extending through the handgrip shaft pivot assembly hinge formation 266 of the pivotal handgrip shaft 264. The pivot pin 268 forms a pivotal interface between the pivotal handgrip shaft 264 and the extension handgrip adaptor 270. The pivotal interface enables translation of the extension handle 260 from a configuration where the extension handle 260 is parallel to the ratchet 210 and a configuration where the extension handle 260 is perpendicular to the ratchet 210. The extension handle 260 can include a spring loaded ball lock to disengageably lock the extension handle 260 at a 90° angle and or a 180° angle to the ratchet 210. The inclusion of the extension handle 260 increases the speed of opening doors as an operator can spin and crank the handle five times faster than using the ratchet all self-contained in a versatile unique handle.

An optional lock assembly 300 can be integrated into the mechanically operated hand-held forcible entry device 100 to retain the operational drive ratchet 200 in a stored configuration when the mechanically-operated hand-held forcible entry device 100 is not in use. The lock assembly 300 includes a lock assembly hinge 310, which is affixed to an external surface of the entry device tubular housing 110 by one or more hinge fasteners 312. A pivotal locking arm 320 is pivotally assembled to the lock assembly hinge 310 by a hinge pin 322. The hinge pin 322 is inserted through a locking arm pivot pin receiving bore 324 of the lock assembly hinge, a similar bore formed through the pivotal locking arm 320 and continuing through a second locking arm pivot pin receiving bore 324. The pivotal locking arm 320 rotates between a ratchet retaining configuration and an operational configuration. A distal edge of the pivotal locking arm 320 is temporarily seated within a locking engaging recess 278 (FIG. 13) extending inward from one side of the extension handgrip adaptor 270, thus restricting any rotational movements of the ratchet 210. For use, the pivotal locking arm 320 is rotated disengaging the edge from the locking engaging recess 278, enabling rotation of the ratchet 210.

In use, a distal end of the pivotal locking arm 320 is rotated away from the locking engaging recess 278, releasing the extension handgrip adaptor 270 from the lock assembly 300, thus enabling rotational motion of the operational drive ratchet 200. The extension handle 260 is rotated outward to a generally perpendicular relation with the operational drive ratchet 200. The user grips the rotational external handgrip 262 of the extension handle 260 and begins to apply a force to thereto, rotating the ratchet 210 in either a clockwise or counterclockwise rotation. The rotational direction would be respective to the desired operation of the pressure applicating wedge plate 154. In one direction, the pressure applicating wedge plate 154 is advanced or separated from the fixed wedge plate foot 152. In the opposite direction, the pressure applicating wedge plate 154 is retracted or drawn towards the fixed wedge plate foot 152. The rotational direction is dictated by the arrangement of the bevel gears 128, 138 and the handing or direction of the thread formation of the central helical pressure applicating lead screw 130.

A second exemplary embodiment, referred to as a powered hand-held forcible entry device 400 is presented in FIGS. 18 through 24. The operational drive ratchet 200 is a power operated version of the mechanically-operated hand-held forcible entry device 100 used to forcibly separate a closure (such as a door, a window, a gate, and the like) and a respective closure frame (such as a door frame, a window frame, a fence, and the like) from one another, thus dislodging the locking mechanism extending between the closure and the respective closure frame. The majority of the components of the powered hand-held forcible entry device 400 are similar to those of the mechanically-operated hand-held forcible entry device 100, wherein like features of the powered hand-held forcible entry device 400 and the mechanically-operated hand-held forcible entry device 100 are numbered the same except preceded by the numeral "4".

A powered torque is applied to an input drive shaft torque application end 422 of the powered hand-held forcible entry device 400 by a powered torque applicator 600 and an intermediary torque converting reduction gear 500. The powered torque applicator 600 can be any powered rotary device, such as a drill, a powered screwdriver, and the like. The powered torque applicator 600 can be electrically powered, pneumatically powered, or any other suitable power source known by those skilled in the art. In the exemplary embodiment, the powered torque applicator 600 contains a drive motor arranged to directly or indirectly rotate a torque applicating engagement element 610. The drive motor and any intermediary components, such as a torque converter, a clutch, and the like are encased within a powered torque applicator housing 602. Power can be provided by a removable portable power supply 604, which is preferably removably attached to the powered torque applicator housing 602. The preferred removable portable power supply 604 is a rechargeable lithium ion battery.

The torque converting reduction gear 500 integrates a series of gears to convert a low torque, high-speed rotation to a high torque, low speed rotation within a torque converting reduction gear housing 502. It is also preferred that the input rotational direction and the output rotation direction are the same. In the exemplary embodiment, the torque converting reduction gear 500 comprises a series of three serially engaged gears: an input gear 504, an intermediary gear 506, and an output gear 508. Each gear 504, 506, 508 rotates about a respective central axis. Each gear 504, 506, 508 is rotationally assembled to the torque converting reduction gear housing 502 using any suitable rotating retention feature, including a centrally located axle, a bearing, a peripheral edge of a cavity, and the like. A torsional input feature 510 is formed in an input side of the input gear 504, wherein the torsional input feature 510 is sized and shaped to torsionally engage with the torque applicating engagement element 610. In a design where the torsional input feature 510 is a bore, the bore would have a non-circular cross section interior shape and the exterior surface of the torque applicating engagement element 610 would have a mating non-circular cross section shape. In a design where the torsional input feature 510 is a shaft, the shaft would have a non-circular exterior cross section shape and the torque applicating engagement element 610 would include a bore have a mating non-circular cross section shape. Similarly, a torsional output feature 522 is formed in an output side of the output gear 508, wherein the torsional output feature 522 is sized and shaped to torsionally engage with the input drive shaft torque application end 422. The torque converting reduction gear 500 is affixed to an external surface of a sidewall of the entry device tubular housing 410.

In operation, the torque applicating engagement element 610 of the powered torque applicator 600 is coupled with the torsional input feature 510. An operational power switch 606 controls power transfer from the removable portable power supply 604 to the motor. The torque applicating engagement element 610 rotates the input gear 504 in a first rotational direction, which rotates the intermediary gear 506 in an opposite, second rotational direction and preferably at a different speed, which in turn rotates the output gear 508 in the first rotational direction and at a reduced rotational speed, while exerting a greater torque. The greater torque is transferred from the torque converting reduction gear 500 to the powered hand-held forcible entry device 400 by the coupling between the torsional output feature 522 and the input drive shaft torque application end 422. The rotational energy applied to the input drive shaft torque application end 422 operates the powered hand-held forcible entry device 400 as described above in the manner of operation of the mechanically operated hand-held forcible entry device 100.

In an exemplary embodiment, the powered hand-held forcible entry device 400 is employed to forcibly open a locked locking passageway 700. The exemplary locking passageway 700 includes a lockable door 710 assembled and locked to a doorframe 720. One example of a locking interface includes a dead latch (a moving locking bolt or other locking feature controlled by a key or other operational device), wherein the dead latch is commonly assembled to a lockable door 710 and a strike plate with is commonly assembled to a doorframe 720, wherein an aperture through the strike plate is aligned with a dead latch receiving cavity extending into the respective surface of the doorframe 720. The dead latch receiving cavity is located in registration with the dead latch. When locked, the dead latch is extended from the door edge 712, passing through the strike plate and inserted into the dead latch receiving cavity.

The powered hand-held forcible entry device 400 (as well as the mechanically operated hand-held forcible entry device 100) can include an optional torsional application handgrip assembly 470. The exemplary torsional application handgrip assembly 470 extends from the tubular housing cover 460 generally parallel to and preferably concentric with a longitudinal axis of the entry device tubular housing 410. The torsional application handgrip assembly 470 includes a torsional handgrip element 474 assembled to a free, distal end of a torsional handgrip elongated member 472. A proximal, assembly end of the torsional handgrip elongated member 472 is affixed to the tubular housing cover 460 using any suitable assembly interface. In the exemplary embodiment, the torsional handgrip elongated member 472 is threadably assembled to the tubular housing cover 460 using a torsional handgrip threaded interface 476. It is understood that the torsional handgrip elongated member 472 can be assembled to the powered hand-held forcible entry device 400 at any suitable location and using any suitable fixed or separating interface. The torsional handgrip elongated member 472 would be manufactured using a material suitable for reliably applying a large torsional force to the powered hand-held forcible entry device 400. The torsional handgrip element 474 would be manufactured using any suitable material providing sufficient grip and comfort to the user. The torsional application handgrip assembly 470 enables a user to apply a torsional force to the powered hand-held forcible entry device 400, thus enhancing the ability to use the powered hand-held forcible entry device 400 as a pry to further aid in forcibly opening the locked closure. The longer the torsional handgrip elongated member 472, the greater the applied torque. Although the exemplary embodiment illustrates a torsional handgrip elongated member 472 having a linear shape, it is understood that the torsional handgrip elongated member 472 can be any shape suitable for applying a torque or prying force to the locked closure using the powered hand-held forcible entry device 400.

Figure 25:
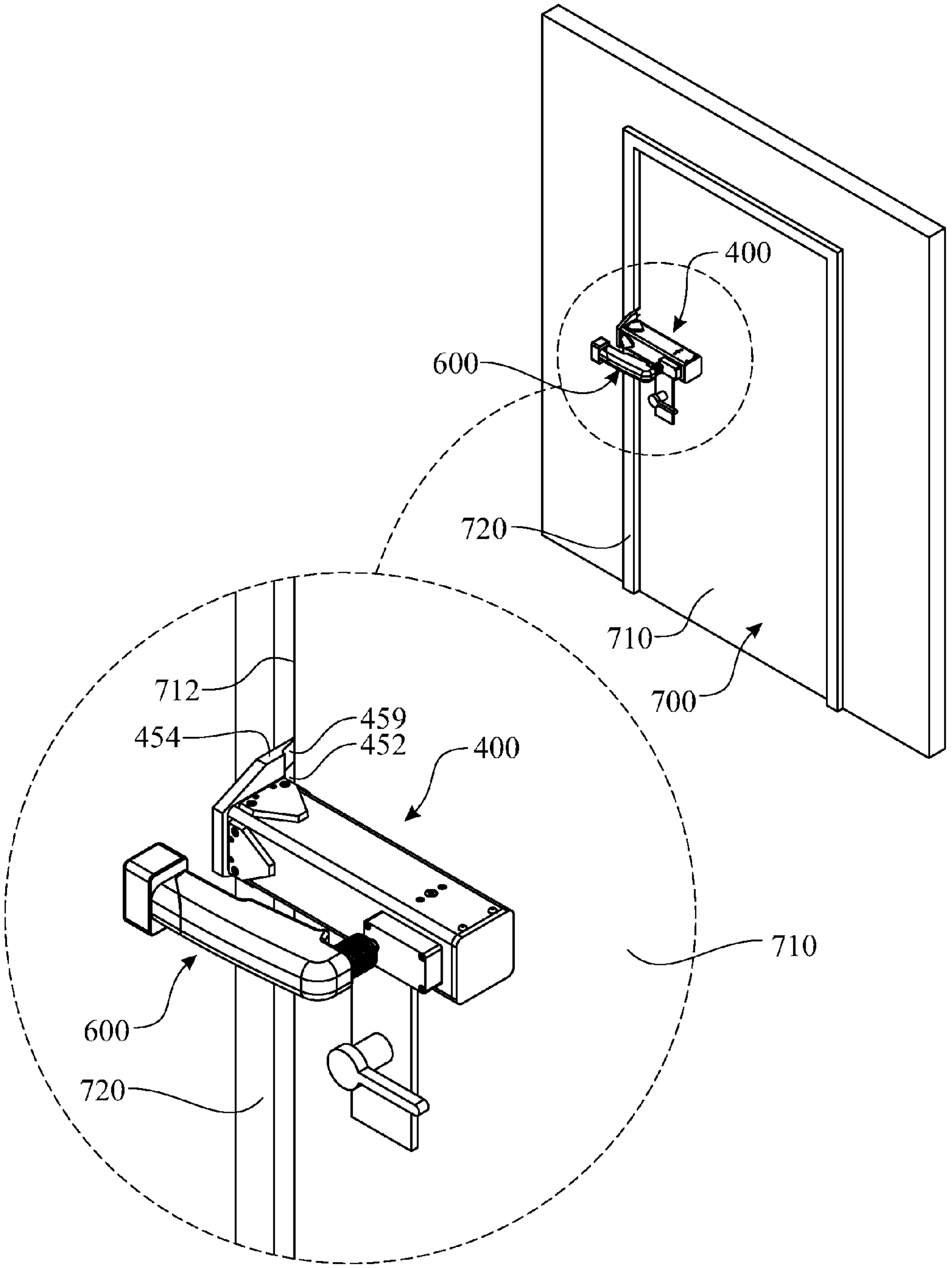
FIG. 25 presents an isometric view of the hand held forcible entry device originally introduced in FIG. 18, shown in operation separating a door from a door jam.

Details of the powered hand-held forcible entry device 400 in practice are presented in FIG. 25. The powered hand-held forcible entry device 400 is positioned inserting a wedge end of the fixed wedge plate 450 and pressure applicating wedge plate 454 between the lockable door 710 and the doorframe 720. The torque converting reduction gear 500 is assembled to the entry device tubular housing 410 engaging the torsional output feature 522 and the input drive shaft torque application end 422 with one another. The powered torque applicator 600 is located engaging the torque applying engagement element 610 and the torsional input feature 510 with one another. The user activates the operational power switch 606, applying power to the powered torque applicator 600, which rotates the torque applicating engagement element 610. The rotational energy provided by the torque applicating engagement element 610 is transferred to the torque converting reduction gear 500, which in turn, transfers the rotational energy to the input drive shaft torque application end 422. The input drive shaft torque application end 422 rotates the torque application bevel gear 428, which in turn rotates a lead screw bevel drive gear 438. The rotational motion of the lead screw bevel drive gear 438 rotates a central helical pressure applicating lead screw 430 accordingly. The central helical pressure applicating lead screw 430 threadably engages with the pressure generating platform 442. The rotational motion of the central helical pressure applicating lead screw 430 drives the pressure generating platform 442 along an axial motion of the central helical pressure applicating lead screw 430. In a forcibly opening process, the pressure generating platform 442 is driven towards the fixed wedge plate foot 452. The pressure generating platform 442 transfers the axial motion to the pressure applicating wedge plate 454 by a series of pressure applicating transfer columns 446. The resulting motion separates the pressure applicating wedge plate 454 and the fixed wedge plate foot 452. The separation expands a gap extending between a door edge 712 of the doorframe 720 and the opposing face of the doorframe 720. As the gap expands, the separation dislodges the dead latch from the strike plate, enabling the lockable door 710 to be opened.

The exemplary forcible entry device 100, 400 can be manufactured in any suitable size having any suitable stroke provided between the fixed wedge plate foot 152 and the pressure applicating wedge plate 154. The preferred embodiments would be manufactured in two different sizes, a smaller unit having a fixed wedge plate foot 152 to pressure applicating wedge plate 154 stroke extending between zero and three inches, with a larger unit having a fixed wedge plate foot 152 to pressure applicating wedge plate 154 stroke extending between zero and seven inches.

Figure 21:
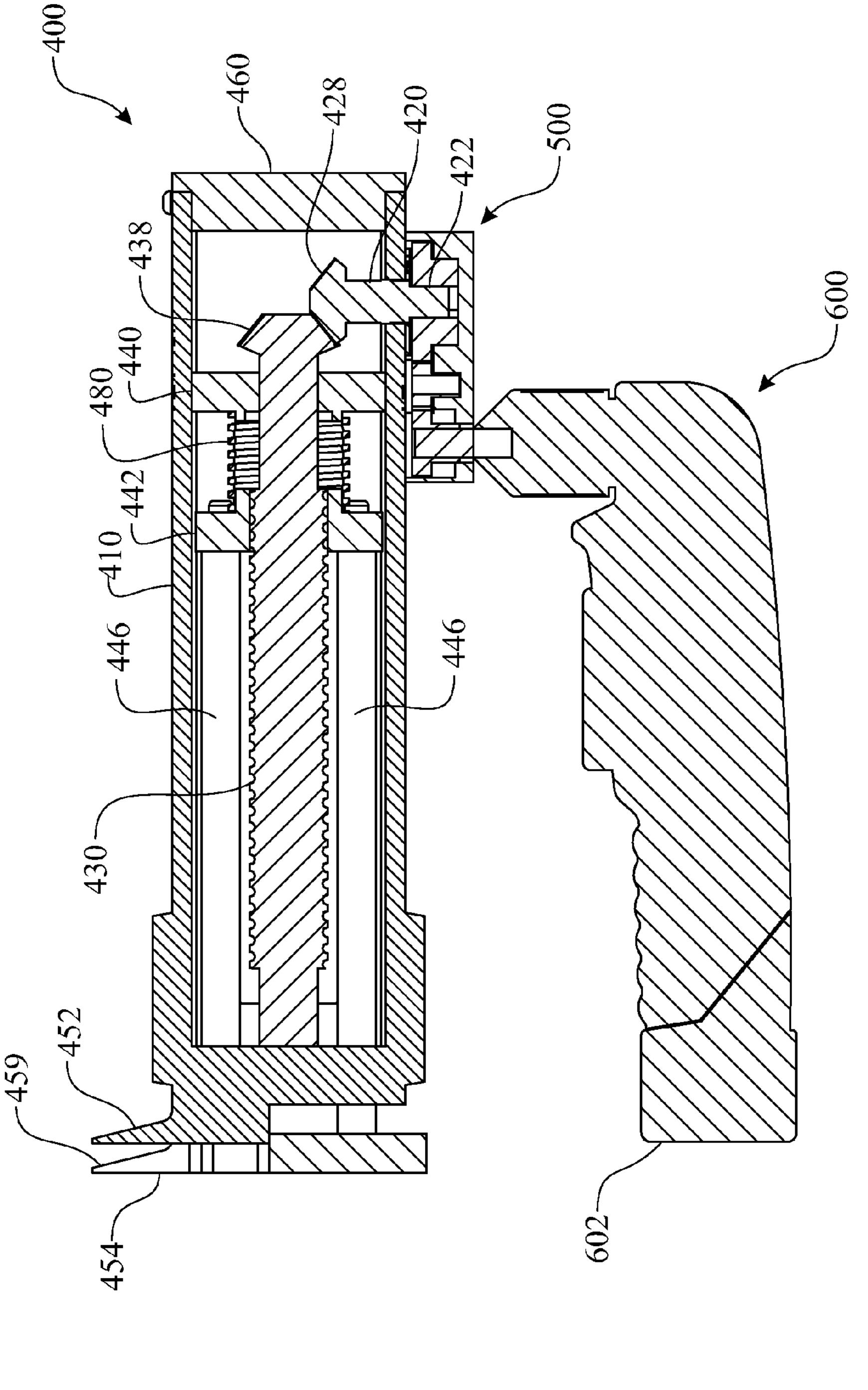
FIG. 21 presents a sectioned side elevation view of the hand held forcible entry device originally introduced in FIG. 18.
Figure 22:
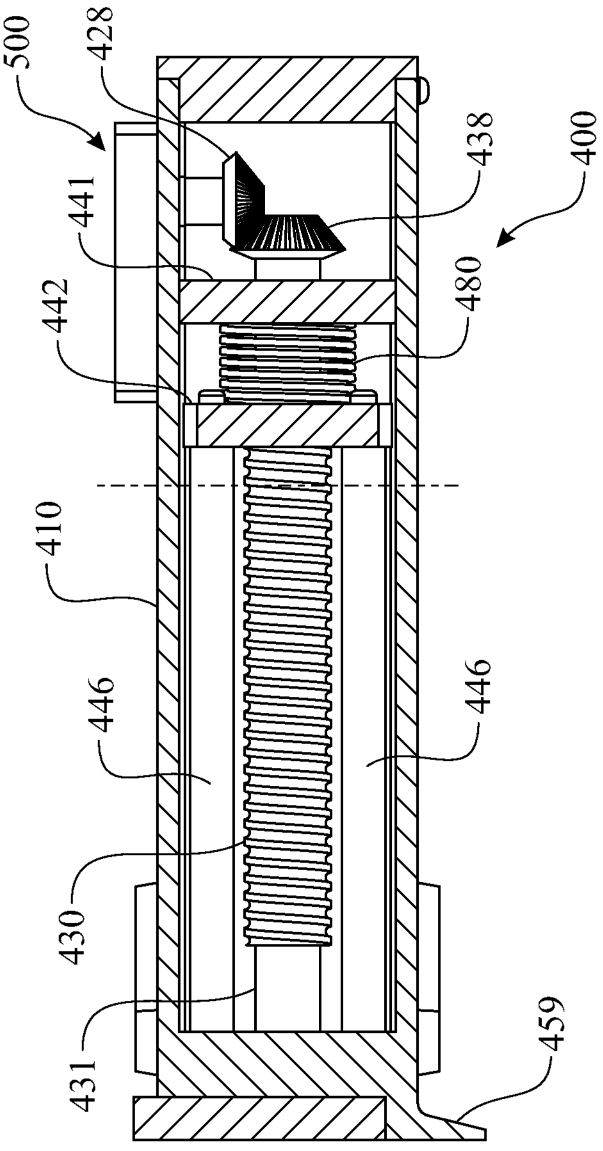
FIG. 22 presents a partially sectioned side elevation view of the hand held forcible entry device originally introduced in FIG. 18, the hand held forcible entry device being shown in a retracted configuration.
Figure 23:
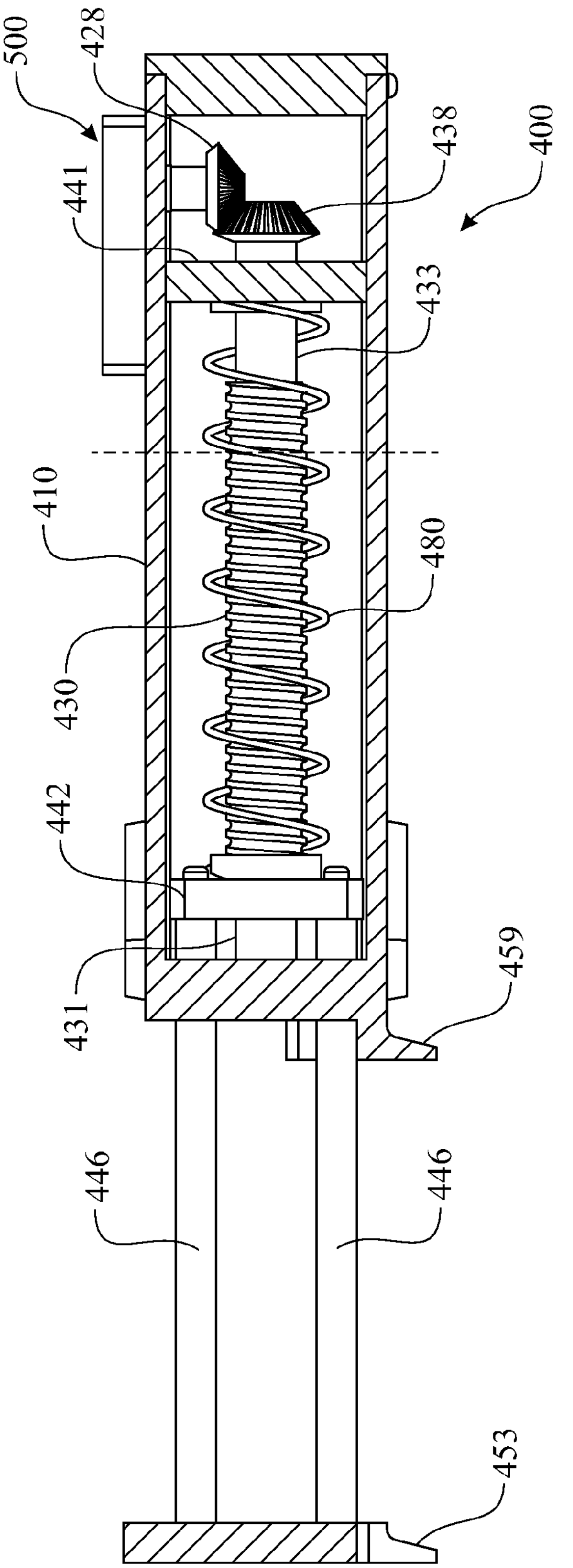
FIG. 23 presents a partially sectioned side elevation view of the hand held forcible entry device originally introduced in FIG. 18, the hand held forcible entry device being shown in an extending operational configuration.
Figure 24:
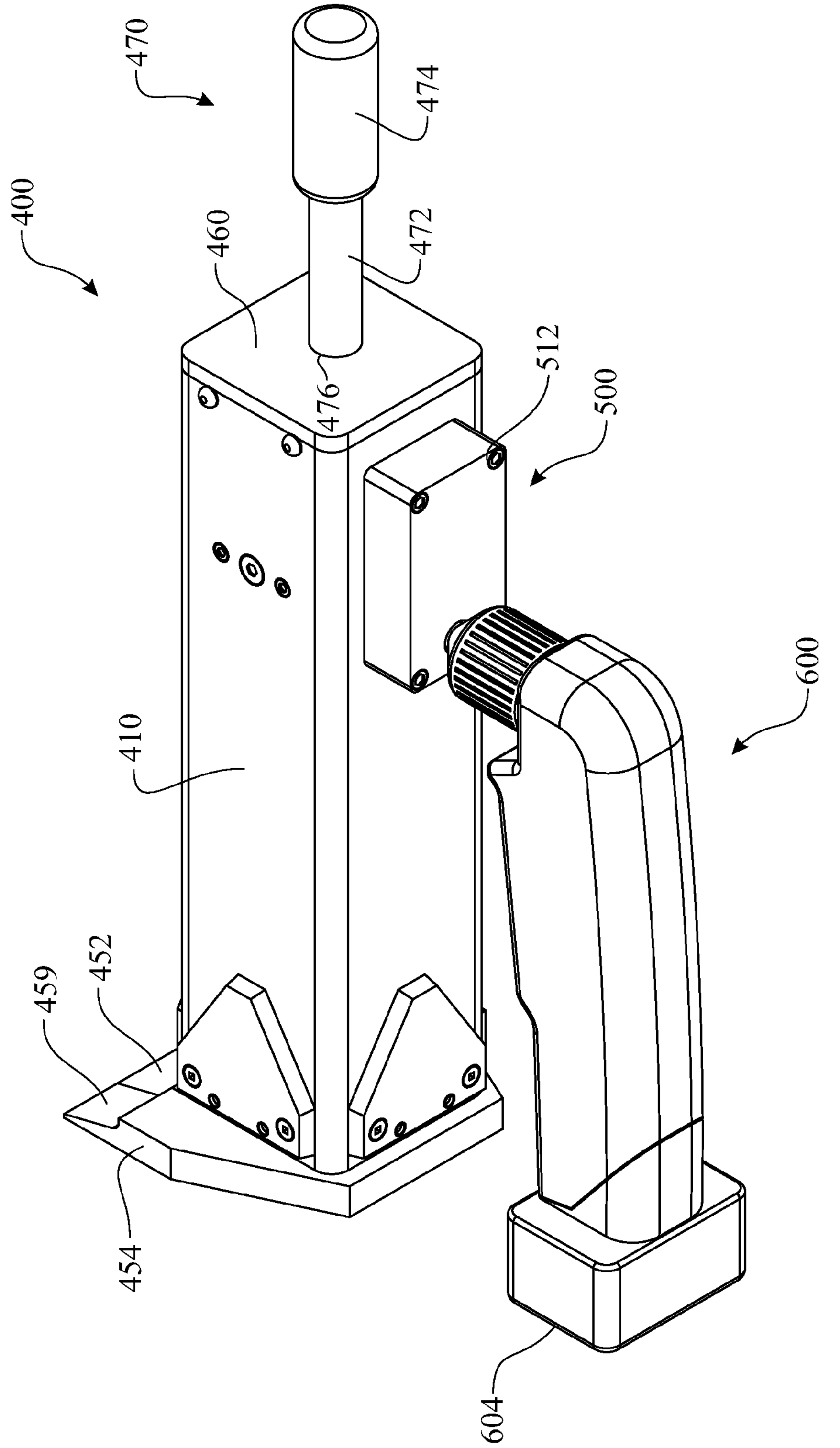
FIG. 24 presents an isometric view of the hand held forcible entry device originally introduced in FIG. 18, further comprising an upper grip to introduce a capability for using the hand held forcible entry device as a pry bar.

An optional pressure applicator control biasing member 480 can be integrated into the hand-held forcible entry device 100, 400, as illustrated in FIGS. 21 through 23. The pressure applicator control biasing member 480 can be any suitable biasing member, wherein the exemplary embodiment is a coil spring. The pressure applicator control biasing member 480 can be designed to have a neutral bias when the pressure generating platform 442 is located at a generally central position. The pressure applicator control biasing member 480 would be placed in a compression state, applying an expanding return force to the pressure generating platform 442 when the pressure generating platform 442 is moved towards a beveled gear end of the hand-held forcible entry device 100, 400. The pressure applicator control biasing member 480 would be placed in a tensile state, applying a retracting return force to the pressure generating platform 442 when the pressure generating platform 442 is moved towards a beveled gear end of the hand-held forcible entry device 100, 400. The broken traversing line presented in FIGS. 22 and 23 present a position of the pressure generating platform 442 where the pressure applicator control biasing member 480 would be in a normal unbiased state.

Although the exemplary embodiment presented in FIG. 25 utilizes a powered hand-held forcible entry device 400, it is understood that the mechanically operated hand-held forcible entry device 100 can be employed in the same matter to forcibly open the locking passageway 700.

Although the exemplary locking passageway 700 is directed towards a lockable door 710 and respective doorframe 720, it is understood that the locking passageway 700 can be a window and a respective window frame, a gate and respective fence, and the like.

While the preferred embodiments of the invention have been described above, it will be recognized and understood that various modifications can be made in the invention and the appended claims are intended to cover all such modifications which may fall within the spirit and scope of the invention.

What is claimed is:

1. A hand-held forcible entry device, comprising:

a forcible entry device tubular housing formed having a tubular section extending along a longitudinal axis between an entry device tubular housing capped end and an entry device tubular housing operational end;

an input drive shaft rotationally assembled to said forcible entry device tubular housing, wherein said input drive shaft is oriented being generally perpendicular to said tubular housing longitudinal axis;

an input drive shaft torque application end provided at an exposed end of said input drive shaft;

a torque application bevel gear concentrically affixed to said input drive shaft providing unison rotation therewith;

a central helical pressure applicating lead screw comprising a helically shaped threaded central section extending between a lead screw drive gear engaging end and a lead screw distal end, wherein said central helical pressure applicating lead screw is rotationally assembled to said forcible entry device tubular housing, wherein said central helical pressure applicating lead screw is oriented being generally parallel to said tubular housing longitudinal axis;

a lead screw bevel drive gear concentrically affixed to said lead screw drive gear engaging end providing unison rotation therewith, wherein said lead screw bevel drive gear and said torque application bevel gear are rotationally engaged with one another;

a fixed wedge plate comprising an operating edge, said fixed wedge plate being assembled to said entry device tubular housing operational end;

a pressure generating platform threadably engaged with said helically shaped threaded central section;

a pressure applicating wedge plate comprising an operating edge; and at least one pressure applicating transfer column extending between a torque applicating end and a pressure transfer end, said torque applicating end being assembled to said pressure generating platform and said pressure transfer end being assembled to said pressure applicating wedge plate;

wherein a torque applied to said input drive shaft torque application end rotates said input drive shaft, which in turn rotates said torque application bevel gear in unison therewith, which engages and rotates said lead screw bevel drive gear, which rotates said central helical pressure applicating lead screw in unison therewith, which translates said pressure generating platform in a direction parallel to said longitudinal axis, which transfers said axial motion to said at least one pressure applicating transfer column, which moves said pressure applicating wedge plate respective to said fixed wedge plate.

2. A hand-held forcible entry device as recited in claim 1, said fixed wedge plate further comprising at least one fixed wedge plate drive column clearance bore, wherein each of said at least one pressure applicating transfer column passes through a respective at least one fixed wedge plate drive column clearance bore.

3. A hand-held forcible entry device as recited in claim 1, said fixed wedge plate further comprising a fixed wedge plate foot, wherein said operating edge is formed along an edge of said fixed wedge plate foot.

4. A hand-held forcible entry device as recited in claim 3, said pressure applicating wedge plate further comprising a fixed wedge plate foot clearance, wherein said fixed wedge plate foot nests within said fixed wedge plate foot clearance.

5. A hand-held forcible entry device as recited in claim 4, said pressure applicating wedge plate further comprising a fixed wedge plate foot exposed surface and said pressure applicating wedge plate comprising a pressure applicating wedge plate exposed surface, wherein said fixed wedge plate foot exposed surface and said pressure applicating wedge plate exposed surface are coplanar when said wedge plate foot is positioned nesting within said fixed wedge plate foot clearance.

6. A hand-held forcible entry device as recited in claim 1, further comprising a plurality of pressure applicating transfer columns extending between a torque applicating end and a pressure transfer end in a spatial and parallel relation with one another.

7. A hand-held forcible entry device as recited in claim 1, further comprising a stationary thrust platform being assembled to said forcible entry device tubular housing, wherein said lead screw drive gear engaging end is rotationally supported by said stationary thrust platform; and the lead screw distal end is rotationally supported by said fixed wedge plate.

8. A hand-held forcible entry device, comprising:

a forcible entry device tubular housing formed having a tubular section extending along a longitudinal axis between an entry device tubular housing capped end and an entry device tubular housing operational end;

an input drive shaft rotationally assembled to said forcible entry device tubular housing, wherein said input drive shaft is oriented being generally perpendicular to said tubular housing longitudinal axis;

an input drive shaft torque application end provided at an exposed end of said input drive shaft;

a torque application bevel gear concentrically affixed to said input drive shaft providing unison rotation therewith;

a central helical pressure applicating lead screw comprising a helically shaped threaded central section extending between a lead screw drive gear engaging end and a lead screw distal end, wherein said central helical pressure applicating lead screw is rotationally assembled to said forcible entry device tubular housing, wherein said central helical pressure applicating lead screw is oriented being generally parallel to said tubular housing longitudinal axis;

a lead screw bevel drive gear concentrically affixed to said lead screw drive gear engaging end providing unison rotation therewith, wherein said lead screw bevel drive gear and said torque application bevel gear are rotationally engaged with one another;

a fixed wedge plate comprising an operating edge, said fixed wedge plate being assembled to said entry device tubular housing operational end;

a pressure generating platform threadably engaged with said helically shaped threaded central section;

a pressure applicating wedge plate comprising an operating edge;

at least one pressure applicating transfer column extending between a torque applicating end and a pressure transfer end, said torque applicating end being assembled to said pressure generating platform and said pressure transfer end being assembled to said pressure applicating wedge plate; and a torque applicator engaged with said input drive shaft torque application end;

wherein a torque applied to said input drive shaft torque application end rotates said input drive shaft, which in turn rotates said torque application bevel gear in unison therewith, which engages and rotates said lead screw bevel drive gear, which rotates said central helical pressure applicating lead screw in unison therewith, which translates said pressure generating platform in a direction parallel to said longitudinal axis, which transfers said axial motion to said at least one pressure applicating transfer column, which moves said pressure applicating wedge plate respective to said fixed wedge plate.

9. A hand-held forcible entry device as recited in claim 8, said fixed wedge plate further comprising at least one fixed wedge plate drive column clearance bore, wherein each of said at least one pressure applicating transfer column passes through a respective at least one fixed wedge plate drive column clearance bore.

10. A hand-held forcible entry device as recited in claim 8, said fixed wedge plate further comprising a fixed wedge plate foot, wherein said operating edge is formed along an edge of said fixed wedge plate foot.

11. A hand-held forcible entry device as recited in claim 10, said pressure applicating wedge plate further comprising a fixed wedge plate foot clearance, wherein said fixed wedge plate foot nests within said fixed wedge plate foot clearance.

12. A hand-held forcible entry device as recited in claim 11, said pressure applicating wedge plate further comprising a fixed wedge plate foot exposed surface and said pressure applicating wedge plate comprising a pressure applicating wedge plate exposed surface, wherein said fixed wedge plate foot exposed surface and said pressure applicating wedge plate exposed surface are coplanar when said wedge plate foot is positioned nesting within said fixed wedge plate foot clearance.

13. A hand-held forcible entry device as recited in claim 8, further comprising a plurality of pressure applicating transfer columns extending between a torque applicating end and a pressure transfer end in a spatial and parallel relation with one another.

14. A hand-held forcible entry device as recited in claim 8, further comprising a stationary thrust platform being assembled to said forcible entry device tubular housing, wherein said lead screw drive gear engaging end is rotationally supported by said stationary thrust platform; and the lead screw distal end is rotationally supported by said fixed wedge plate.

15. A hand-held forcible entry device, comprising:

a forcible entry device tubular housing formed having a tubular section extending along a longitudinal axis between an entry device tubular housing capped end and an entry device tubular housing operational end;

an input drive shaft rotationally assembled to said forcible entry device tubular housing, wherein said input drive shaft is oriented being generally perpendicular to said tubular housing longitudinal axis;

an input drive shaft torque application end provided at an exposed end of said input drive shaft;

a torque application bevel gear concentrically affixed to said input drive shaft providing unison rotation therewith;

a central helical pressure applicating lead screw comprising a helically shaped threaded central section extending between a lead screw drive gear engaging end and a lead screw distal end, wherein said central helical pressure applicating lead screw is rotationally assembled to said forcible entry device tubular housing, wherein said central helical pressure applicating lead screw is oriented being generally parallel to said tubular housing longitudinal axis;

a lead screw bevel drive gear concentrically affixed to said lead screw drive gear engaging end providing unison rotation therewith, wherein said lead screw bevel drive gear and said torque application bevel gear are rotationally engaged with one another;

a fixed wedge plate comprising an operating edge, said fixed wedge plate being assembled to said entry device tubular housing operational end;

a pressure generating platform threadably engaged with said helically shaped threaded central section;

a pressure applicating wedge plate comprising an operating edge;

at least one pressure applicating transfer column extending between a torque applicating end and a pressure transfer end, said torque applicating end being assembled to said pressure generating platform and said pressure transfer end being assembled to said pressure applicating wedge plate; and a powered torque applicator engaged with said input drive shaft torque application end;

wherein a torque applied to said input drive shaft torque application end rotates said input drive shaft, which in turn rotates said torque application bevel gear in unison therewith, which engages and rotates said lead screw bevel drive gear, which rotates said central helical pressure applicating lead screw in unison therewith, which translates said pressure generating platform in a direction parallel to said longitudinal axis, which transfers said axial motion to said at least one pressure applicating transfer column, which moves said pressure applicating wedge plate respective to said fixed wedge plate.

16. A hand-held forcible entry device as recited in claim 15, said fixed wedge plate further comprising at least one fixed wedge plate drive column clearance bore, wherein each of said at least one pressure applicating transfer column passes through a respective at least one fixed wedge plate drive column clearance bore.

17. A hand-held forcible entry device as recited in claim 15, said fixed wedge plate further comprising a fixed wedge plate foot, wherein said operating edge is formed along an edge of said fixed wedge plate foot.

18. A hand-held forcible entry device as recited in claim 17, said pressure applicating wedge plate further comprising a fixed wedge plate foot clearance, wherein said fixed wedge plate foot nests within said fixed wedge plate foot clearance.

19. A hand-held forcible entry device as recited in claim 18, said pressure applicating wedge plate further comprising a fixed wedge plate foot exposed surface and said pressure applicating wedge plate comprising a pressure applicating wedge plate exposed surface, wherein said fixed wedge plate foot exposed surface and said pressure applicating wedge plate exposed surface are coplanar when said wedge plate foot is positioned nesting within said fixed wedge plate foot clearance.

20. A hand-held forcible entry device as recited in claim 15, further comprising a plurality of pressure applicating transfer columns extending between a torque applicating end and a pressure transfer end in a spatial and parallel relation with one another.

21. A hand-held forcible entry device as recited in claim 15, further comprising a stationary thrust platform being assembled to said forcible entry device tubular housing, wherein said lead screw drive gear engaging end is rotationally supported by said stationary thrust platform; and the lead screw distal end is rotationally supported by said fixed wedge plate.

* * * * *